(12) United States Patent
Yao et al.

(10) Patent No.: US 12,487,381 B2
(45) Date of Patent: Dec. 2, 2025

(54) DIFFRACTIVE OPTICAL ELEMENT AND TERMINAL DEVICE

(71) Applicant: HUAWEI TECHNOLOGIES CO., LTD., Guangdong (CN)

(72) Inventors: Zhanshi Yao, Shenzhen (CN); Rui Guo, Shenzhen (CN); Xiaolu Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 18/357,458

(22) Filed: Jul. 24, 2023

(65) Prior Publication Data

US 2023/0367129 A1 Nov. 16, 2023

Related U.S. Application Data

(63) Continuation of application No. PCT/CN2021/127093, filed on Oct. 28, 2021.

(30) Foreign Application Priority Data

Jan. 26, 2021 (CN) .......................... 202110102133.X

(51) Int. Cl.
*G02B 5/18* (2006.01)
*G02B 27/01* (2006.01)
*G02B 27/44* (2006.01)

(52) U.S. Cl.
CPC ............. *G02B 5/18* (2013.01); *G02B 5/1861* (2013.01); *G02B 27/44* (2013.01); *G02B 27/0172* (2013.01); *G02B 2027/0178* (2013.01)

(58) Field of Classification Search
None
See application file for complete search history.

(56) References Cited

U.S. PATENT DOCUMENTS

2015/0063753 A1  3/2015  Evans et al.
2016/0154150 A1*  6/2016  Simmonds ........... G02B 5/1842
                                              385/37
(Continued)

FOREIGN PATENT DOCUMENTS

CN  102147492 A  8/2011
CN  210166574 U  3/2020
(Continued)

OTHER PUBLICATIONS

Kaur et al., "Two-way Reflector Based on Two-Dimensional Sub-Wavelength High-Index Contrast Grating on SOI," Optics Communications, No. 366, Jan. 30, 2016, 5 pages.
(Continued)

*Primary Examiner* — Jerry Rahll
(74) *Attorney, Agent, or Firm* — Fish & Richardson P.C.

(57) ABSTRACT

Example diffractive optical elements and terminal devices are disclosed. One example diffractive optical element includes grating components periodically distributed in a first dimension. The grating component includes N optical waveguides. The N optical waveguides include M optical waveguides that periodically change in a second dimension. At least two of the M optical waveguides that periodically change in the second dimension have different structures. An included angle between the second dimension and the first dimension is greater than 0 degrees and less than 180 degrees. N is an integer greater than 1. M is an integer greater than 1 and not greater than N.

20 Claims, 33 Drawing Sheets

(56) References Cited

U.S. PATENT DOCUMENTS

| | | | |
|---|---|---|---|
| 2016/0356956 A1* | 12/2016 | Davoine | G02B 27/4272 |
| 2020/0049997 A1 | 2/2020 | Song et al. | |
| 2020/0073031 A1 | 3/2020 | Born et al. | |
| 2020/0096767 A1* | 3/2020 | Basset | G02B 6/0036 |
| 2020/0264367 A1 | 8/2020 | Huang et al. | |

FOREIGN PATENT DOCUMENTS

| | | |
|---|---|---|
| CN | 111221064 A | 6/2020 |
| CN | 113156581 A | 7/2021 |
| CN | 113363368 A | 9/2021 |
| EP | 3205512 A1 | 8/2017 |
| JP | 2017503203 A | 1/2017 |
| JP | 2018502328 A | 1/2018 |
| JP | 2020518864 A | 6/2020 |
| JP | 2020524296 A | 8/2020 |
| WO | 2012092828 A1 | 7/2012 |

OTHER PUBLICATIONS

Quaranta et al., "Color-Selective and Versatile Light Steering with up-Scalable Subwavelength Planar Optics," ACS Photonics 2017, May 9, 2017, 7 pages.
Sun et al., "All-Dielectric Full-Color Printing with TiO2 Metasurfaces," ACS Nano 2017, May 16, 2017, 8 pages.
Office Action in Japanese Appln. No. 2023-544634, mailed on Jun. 25, 2024, 12 pages (with English translation).
Extended European Search Report in European Appln No. 21922416.9, dated May 14, 2024, 9 pages.

* cited by examiner

DIFFRACTIVE OPTICAL ELEMENT AND TERMINAL DEVICE

CROSS-REFERENCE TO RELATED APPLICATIONS

This application is a continuation of International Application No. PCT/CN2021/127093, filed on Oct. 28, 2021, which claims priority to Chinese Patent Application No. 202110102133.X, filed on Jan. 26, 2021. The disclosures of the aforementioned applications are hereby incorporated by reference in their entireties.

TECHNICAL FIELD

This application relates to the field of diffractive optical element technologies, and in particular, to a diffractive optical element and a terminal device.

BACKGROUND

An augmented reality (augmented reality, AR) technology integrates the real world and the virtual world. The technology can simulate and superimpose sensory (such as visual, auditory, and tactile) experience that does not exist in the real world and that is generated by a computer to a real world scenario, so that the sensory experience is perceived by a user. In this way, sensory experience beyond the real world is achieved, to enhance the real world scenario. The AR technology is applicable to a wide range of scenarios and has been successfully applied in military, industrial production, medical care, and education fields. In recent years, as 5G high-speed mobile communication technologies become increasingly popular, application scenarios of the AR technology oriented to consumer terminals are continuously expanded, and there is an increasingly promising outlook for large-scale application.

Among several types of sensory experience simulated by the AR technology, visual experience is one of most important types. Therefore, combining light including virtual information with light including external environment information is one of core problems of the AR technology. How to implement a compact and lightweight AR system that can efficiently combine virtual and real optical images is one of hot topics of current research. The AR system is usually divided into two parts: an optical projection system and an optical combiner. The optical combiner needs to transmit actual ambient light, and also needs to reflect projected light of the projection system to human eyes. The optical combiner is a core optical component for virtual-real image fusion, and is also one of key optical components that determine user experience of the AR system. At present, the optical combiner in the existing AR system is usually a semi-reflective semi-transparent mirror, a polarization beam splitter, a waveguide lens, or the like. These types of optical combiners cannot implement both a narrowband response and adjustment on reflection at an abnormal angle. Therefore, the AR system cannot meet requirements for high transmittance of the ambient light and a high reflectivity of the projected light when a volume of the AR system is compact.

In conclusion, providing an optical element that can implement both the narrowband response and the adjustment on reflection at an abnormal angle is a technical problem that needs to be urgently resolved currently.

SUMMARY

This application provides a diffractive optical element and a terminal device, so that the diffractive optical element can implement both a narrowband response and adjustment on reflection at an abnormal angle.

According to a first aspect, this application provides a diffractive optical element. The diffractive optical element includes grating components periodically distributed in a first dimension. The grating component includes N optical waveguides. The N optical waveguides include M optical waveguides that periodically change in a second dimension. At least two of the M optical waveguides that periodically change in the second dimension have different structures. An included angle between the second dimension and the first dimension is greater than 0 degrees and less than 180 degrees. N is an integer greater than 1. M is an integer greater than 1 and not greater than N.

Light in a specific band may be selected based on the diffractive optical element by using the M optical waveguides that periodically change in the second dimension, that is, a narrowband response is implemented. A grating structure is formed by using the grating components periodically distributed in the first dimension, so that a function of adjusting reflection at an abnormal angle is implemented. Further, diffraction efficiency of the reflection at an abnormal angle of the diffractive optical element can be enhanced in a specific band. The diffractive optical element can implement both the narrowband response and the adjustment on reflection at an abnormal angle. Therefore, when the diffractive optical element is applied to an AR device or a VR device, an optical combiner can implement efficient diffraction imaging in a projection light band in a compact volume, and implement high transmittance of ambient light in another band.

In a possible implementation, at least two of the M optical waveguides that periodically change in the second dimension have different structures. For example, the at least two of the M optical waveguides that periodically change in the second dimension may have different periodic change manners. For another example, the at least two of the M optical waveguides that periodically change in the second dimension have different waveguide periods. For still another example, the at least two of the M optical waveguides that periodically change in the second dimension have different shapes.

In a possible implementation, the optical waveguides having different structures in the M optical waveguides that periodically change in the second dimension correspond to different resonance wavelengths of guided-mode resonance. In this way, M different resonance wavelengths can be selected, that is, a narrowband response in M different bands can be implemented.

In a possible implementation, the M optical waveguides that periodically change in the second dimension are configured to reflect light in a specific band. It may also be understood that the M optical waveguides that periodically change in the second dimension are reflective optical waveguides at narrowband wavelengths.

In a possible implementation, at least one of the M optical waveguides that periodically change in the second dimension has at least two different waveguide periods.

Further, optionally, that the optical waveguide has at least two different waveguide periods includes: A top of the optical waveguide has at least two different waveguide periods. Alternatively, any one of two side walls of the optical waveguide has at least two different waveguide periods. Alternatively, each side wall of the optical waveguide has at least one waveguide period, and two side walls have different waveguide periods.

In a possible implementation, a periodic change manner of the optical waveguide includes any one of the following.

Manner 1: The optical waveguide has a periodic protruding portion or a periodic recessed portion.

In the manner 1, the periodic change manner of the optical waveguide is that the optical waveguide has the periodic protruding portion or the periodic recessed portion, and the protruding portion or the recessed portion is located on the top or at least one side wall of the optical waveguide.

In the manner 1, the diffractive optical element is applicable to a scenario in which a narrowband (or referred to as a filtering band) that requires a response is narrow. For example, the diffractive optical element is applicable to light in a wide band emitted by a light source, but a high-resolution optical imaging system in a narrowband is required.

Manner 2: The optical waveguide has a periodic gap.

In the manner 2, the periodic change manner of the optical waveguide is that the optical waveguide has the periodic gap, and a length of the gap in the second dimension meets that incident light is capable of being coupled between two adjacent parts of the optical waveguide to form a waveguide mode. This can implement guided-mode resonance, thereby implementing high diffraction efficiency and selecting a narrowband.

Further, optionally, the length of the gap in the second dimension is not greater than a center wavelength of an operating band.

In a possible implementation, an included angle between a direction of the gap and the first dimension is less than 90 degrees.

In the manner 2, the diffractive optical element is applicable to a scenario in which a requirement for a narrowband filtering function is not high, for example, an imaging system in which a light source is a narrowband laser light source. In addition, a low requirement is imposed on process precision, so that the diffractive optical element can be easily prepared.

Manner 3: The optical waveguide includes periodically distributed small holes, where the small hole is hollow or filled with a material whose refractive index is different from that of a material of the optical waveguide.

In the manner 3, the diffractive optical element is applicable to a scenario requiring a narrow filtering band. For example, the diffractive optical element is applicable to light in a wide band emitted by a light source, but a high-resolution optical imaging system in a narrowband is required.

Manner 4: Periodically distributed diffraction structures are in contact with the optical waveguide, or distances between the periodically distributed diffraction structures and the optical waveguide each do not exceed a preset distance.

In the manner 4, the periodic change manner of the optical waveguide is: the periodically distributed diffraction structures are in contact with the optical waveguide, or the distances between the periodically distributed diffraction structures and the optical waveguide each do not exceed the preset distance, and the diffraction structures are in contact with the top or at least one side wall of the optical waveguide; or the diffraction structures each are located at a position whose distance from one side wall of the optical waveguide is not greater than the preset distance.

In a possible implementation, the preset distance between the diffraction structure and the optical waveguide meets that a light field formed in the optical waveguide spatially overlaps the diffraction structure.

Further, optionally, the preset distance between the diffraction structure and the optical waveguide is not greater than a center wavelength of an operating band.

In the manner 4, the diffractive optical element is applicable to a scenario in which a narrowband (or referred to as a filtering band) that requires a response is narrow. For example, the diffractive optical element is applicable to light in a wide band emitted by a light source, but a high-resolution optical imaging system in a narrowband is required. Alternatively, the diffractive optical element is applicable to a scenario in which a requirement for a narrowband filtering function is not high, for example, an imaging system in which a light source is a narrowband light source. In addition, a low requirement is imposed on process precision, so that the diffractive optical element can be easily prepared.

Manner 5: The refractive index of the optical waveguide periodically changes.

In the manner 5, the diffractive optical element is applicable to a scenario in which a narrowband (or referred to as a filtering band) that requires a response is narrow. For example, the diffractive optical element is applicable to light in a wide band emitted by a light source, but a high-resolution optical imaging system in a narrowband is required. Alternatively, the diffractive optical element is applicable to a scenario in which a requirement for a narrowband filtering function is not high, for example, an imaging system in which a light source is a narrowband light source. In addition, the refractive index of the optical waveguide may periodically change through doping, and a low requirement is imposed on process precision, so that the diffractive optical element can be easily prepared.

In a possible implementation, a grating period in the first dimension is not greater than 2 microns. In this way, an incident angle within a large range can be reflected to a specific direction in space.

In a possible implementation, thicknesses of the N optical waveguides each are not greater than 300 nanometers. This facilitates preparation of the optical waveguide and miniaturization of the diffractive optical element.

In a possible implementation, a material of the N optical waveguides is silicon nitride or titanium dioxide.

When the material of the optical waveguide is silicon nitride or titanium oxide, the diffractive optical element may be prepared in a mature semiconductor micro-nano preparation process. Therefore, mass production is easy. In addition, performance of materials such as silicon nitride or titanium oxide is stable, and the diffractive optical element may have stable performance as much as possible in different environmental conditions. Further, silicon nitride or titanium dioxide is transparent to visible light, to help improve light transmittance.

In a possible implementation, an acute angle formed between any two adjacent optical waveguides in the N optical waveguides is not greater than a preset angle.

The any two adjacent optical waveguides in the N optical waveguides are disposed in parallel or approximately parallel, so that more optical waveguides can be disposed in the grating component, and the more optical waveguides can more flexibly adjust the light field.

In a possible implementation, the first dimension is perpendicular to the second dimension. For example, the first dimension may be a direction of the grating period, and the second dimension may be an extension direction of the optical waveguide.

The first dimension is perpendicular to the second dimension, to facilitate manufacture of the diffractive optical element and make the response more even.

According to a second aspect, this application provides a terminal device. The terminal device includes at least one layer of the diffractive optical element according to any one of the first aspect or the possible implementations of the first aspect, and at least one layer of a substrate. One layer of the diffractive optical element corresponds to one layer of the substrate. Each layer of the diffractive optical element is fastened to a corresponding substrate.

In a possible implementation, parameters of grating components in the diffractive optical element fastened to different regions of the substrate are different. The parameter of the grating component includes a grating period and/or a tilt angle.

In a possible implementation, the terminal device includes an optical projector, and the optical projector is configured to transmit a light beam carrying image information to the diffractive optical element.

For technical effect that can be achieved in any one of the second aspect to the fifth aspect, refer to description of beneficial effect in the first aspect. Details are not described herein again.

DESCRIPTION OF EMBODIMENTS

The following describes in detail embodiments of this application with reference to accompanying drawings.

The following describes some terms in this application. It should be noted that these explanations are intended to facilitate understanding by a person skilled in the art, but do not constitute a limitation on the protection scope claimed in this application.

1. Diffraction Grating

The diffraction grating is a micro-nano optical device that presents a periodic structure change or a periodic refractive index change at a near-wavelength scale, and may perform periodic spatial modulation on an amplitude and/or a phase of incident light.

The diffraction grating may be classified into a reflective diffraction grating and a transmissive diffraction grating. The reflective diffraction grating can reflect the incident light at one or more specific angles. This process may be described by using a diffraction equation (formula 1) of the grating, and different reflection angles correspond to specific diffraction levels.

$$\sin \theta_i - \sin \theta_m = m\lambda/d \qquad \text{formula 1}$$

$\theta_i$ is an incident angle, $\theta_m$ is a diffraction angle with a diffraction order of m, $\lambda$ is a wavelength of the incident light, and d is a grating period (or referred to as a grating constant).

Figure 1:
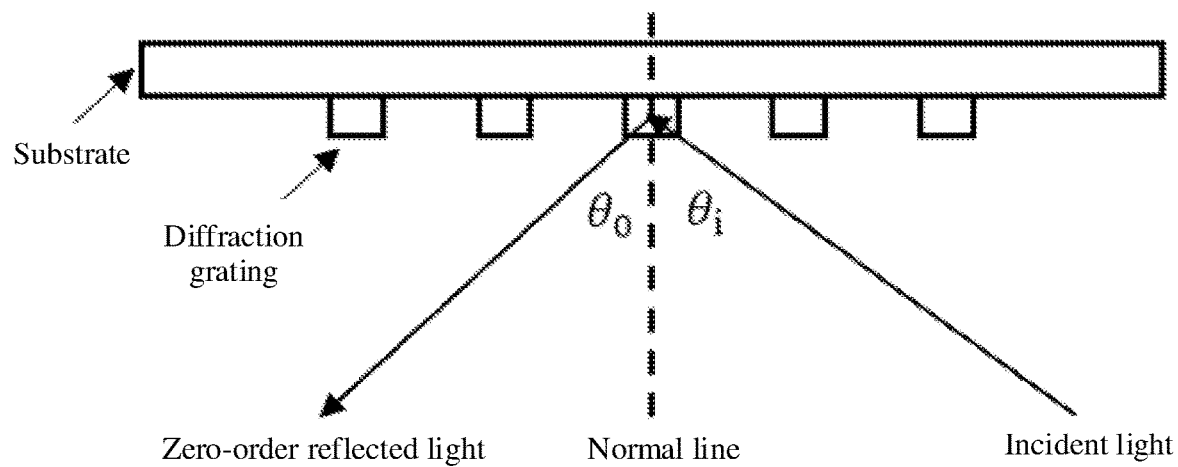
FIG. 1 is a schematic diagram of diffraction grating diffractive light according to this application.

As shown in FIG. 1, a diffraction angle ($\theta_0$) of $0^{th}$ order diffractive light of a diffraction grating is symmetric to an incident angle ($\theta_i$) of incident light about a normal line on a grating surface. In other words, the diffraction angle of the $0^{th}$ order diffractive light is equal to the incident angle, which belongs to symmetric reflection and is not related to a grating period. A diffraction angle of higher-order (±1 order and above) diffractive light is asymmetric to the incident angle of the incident light, which belongs to reflection at an abnormal angle and is related to the grating period. It may also be understood that the diffraction angle of the higher-order diffractive light may be adjusted by changing the grating period, but the diffraction angle of the $0^{th}$ order diffractive light cannot be adjusted.

It should be understood that in the formula 1, the incident light is coplanar. The diffraction angle of the $0^{th}$ order diffractive light is a diffraction angle of diffractive light whose diffraction order is 0. The diffraction angle of the higher-order diffractive light is a diffraction angle of diffractive light whose diffraction order is ±1 or above.

2. Guided-Mode Resonance (Guided-Mode Resonance, GMR)

The guided-mode resonance indicates a phenomenon that a waveguide mode can be excited and a light field can be leaked to free space by introducing a periodic diffractive element (for example, a diffraction grating) to a waveguide when free-space incident light at a specific wavelength meets a phase matching condition. This is due to coupling between the free-space incident light at the specific wavelength and a leakage mode supported by the diffraction grating. It can be learned that the leakage mode corresponds to a waveguide mode in an optical waveguide structure.

The diffraction grating may be considered as periodic modulation of an optical waveguide. For a specific incident wavelength, when diffractive light of the diffraction grating is close to a waveguide mode supported by the optical waveguide in terms of a parameter (for example, a wave vector) (that is, phase matching), the waveguide mode may leak to free space, to form guided-mode resonance. The guided-mode resonance can implement high diffraction efficiency and select a narrowband wavelength (or referred to as a narrowband wavelength response).

3. Waveguide Mode

An electromagnetic field type that can be propagated in a waveguide is referred to as the waveguide mode. There are two eigen-modes in the waveguide: a transverse electric (transverse electric, TE) mode and a transverse magnetic (transverse magnetic, TM) mode, which may be respectively defined by using polarization directions of an electric field and a magnetic field of light. The electric field is polarized only in a y direction parallel to a waveguide interface. The electric field is perpendicular to a transmission direction z of the light and is horizontal. This is referred to as the transverse electric mode. The magnetic field is polarized only in the y direction parallel to the waveguide interface. In this case, the magnetic field is perpendicular to the transmission direction z of the light and is horizontal. This is referred to as the transverse magnetic mode.

4. Phase Delay

A speed of a light wave is slowed down when the light wave passes through a material having a specific refractive index, so that phase delay effect is caused, and this delay effect is referred to as the phase delay.

5. Wavefront

The wavefront is a plane that is formed by mass points that start to be displaced at a specific moment and that exists when a wave propagates in a medium. The wavefront is a wave plane (or referred to as a wave array plane), and is perpendicular to a transmission direction of the wave. It may also be understood as a curved surface formed by points that are at the front of a fluctuation at a specific moment.

6. Evanescent Wave

The evanescent wave is also referred to as an evanescent wave or an evanescent wave (evanescent wave). When total internal reflection occurs on light, a light wave may not be completely reflected back to a first medium on an interface, but is input into a second medium at a depth of about one wavelength, flows along the interface for a wavelength-scale distance, then returns to the first medium, and is emitted in a reflected light direction. This wave along a surface of the second medium is referred to as the evanescent wave.

7. Resonance Wavelength

When a wavelength of incident light meets a phase matching condition, a guided-mode resonance phenomenon is excited and the wavelength becomes the resonance wavelength.

The foregoing describes some terms in this application, and the following describes application scenarios in this application. It should be noted that these explanations are intended to facilitate understanding by a person skilled in the art, but do not constitute a limitation on the protection scope claimed in this application.

In this application, a diffractive optical element is applicable to an imaging system. The imaging system is applicable to the AR field, for example, AR glasses, an AR helmet, and a head-up display (head-up display, HUD) device. Alternatively, the imaging system is applicable to the virtual reality (virtual reality, VR) field, for example, VR glasses or a VR helmet. In the AR field or the VR field, to meet both a compact volume, high-reflectivity projected light, and high-transmittance ambient light, a response (for example, reflection) to light in a specific band (or referred to as a specific wavelength range) needs to be implemented, and reflection at an abnormal angle needs to be adjusted.

Figure 2:
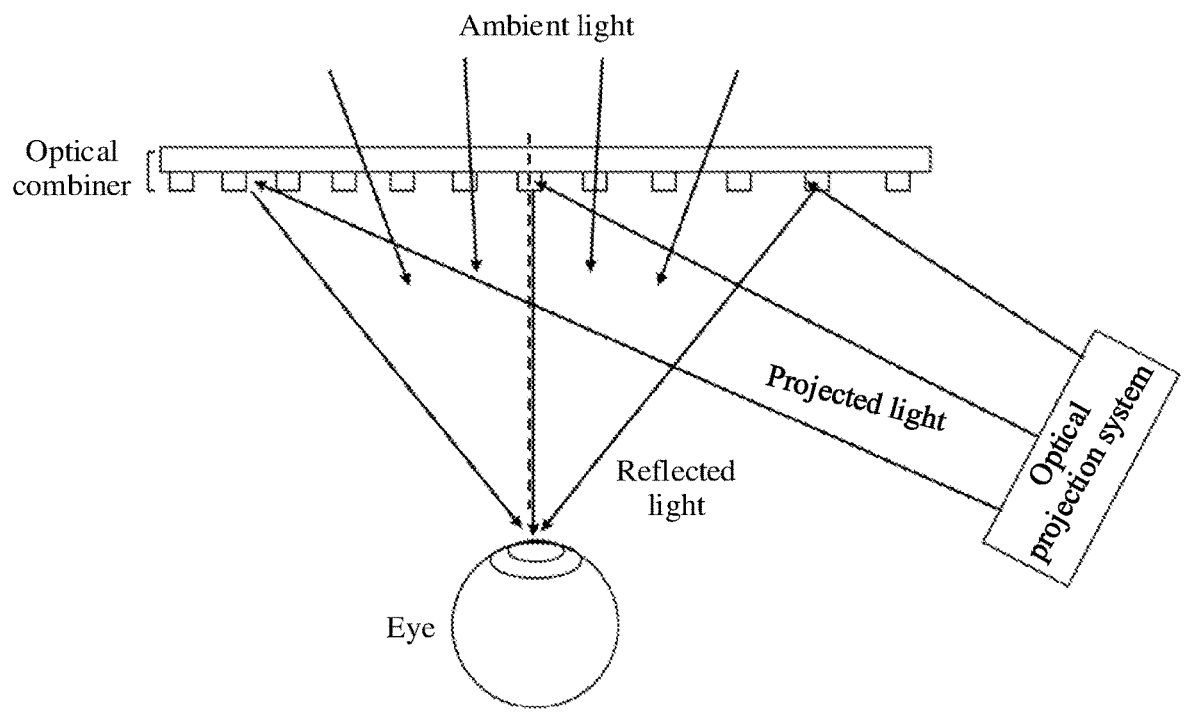
FIG. 2 is a schematic diagram of a possible application scenario according to this application.

FIG. 2 shows a possible application scenario according to this application. AR glasses are used as an example in this application scenario. The AR glasses may include an optical combiner and an optical projection system. The optical projection system is configured to transmit light in a specific band. The light in the specific band carries image information. The optical combiner is configured to reflect the light in the specific band to human eyes for imaging at a specific angle. Ambient light may also be transmitted to the human eyes through the optical combiner for imaging, to implement visual effect of fusion of a real world image and a virtual world image in the AR glasses. It should be understood that a diffractive optical element may be used as the optical combiner in this scenario.

It can be learned based on the possible application scenario that the optical combiner needs to be capable of responding to the light in the specific band and adjusting the light in the specific band to be emitted in a specific direction to space. However, an optical combiner in the conventional technology is usually a semi-transparent semi-reflective mirror or a polarization beam splitter. Neither of the two types of optical combiners can implement both a response to the light in the specific band and adjustment on the direction in which the light in the specific band is emitted to space. Further, the optical projection system needs to be combined with another optical element to propagate light of an image generated by the optical projection system to the human eyes. This is not conducive to miniaturization of AR glasses. In addition, the existing semi-transparent semi-reflective mirror or the polarization beam splitter cannot meet a requirement for high transmittance of the ambient light and high reflectivity of an optical projector.

It should be noted that the scenario is merely an example, and the diffractive optical element provided in this application may be further applied to a plurality of scenarios in which a narrowband wavelength response and/or adjustment on reflection at an abnormal angle are/is required. For example, in a spectrum detection scenario, detected substance exists or a concentration of the detected substance is changed, so that a refractive index outside the diffractive optical element is changed, and a wavelength of reflected light is changed. Therefore, information about the detected substance may be obtained by detecting a change of a reflected light spectrum. Another example is a space optical communication scenario.

In view of this, this application provides a diffractive optical element. The diffractive optical element can respond to light in a specific band, and can adjust reflection at an abnormal angle.

With reference to FIG. 3 to FIG. 14, the following specifically describes the diffractive optical element provided in this application.

According to the foregoing content, this application provides a diffractive optical element. The diffractive optical element may include grating components periodically distributed in a first dimension. The grating component includes N optical waveguides. The N optical waveguides include M optical waveguides that periodically change in a second dimension. At least two of the M optical waveguides that periodically change in the second dimension have different structures. An included angle between the second dimension and the first dimension is greater than 0 degrees and less than 180 degrees. N is an integer greater than 1. M is an integer greater than 1 and not greater than N.

Figure 3:
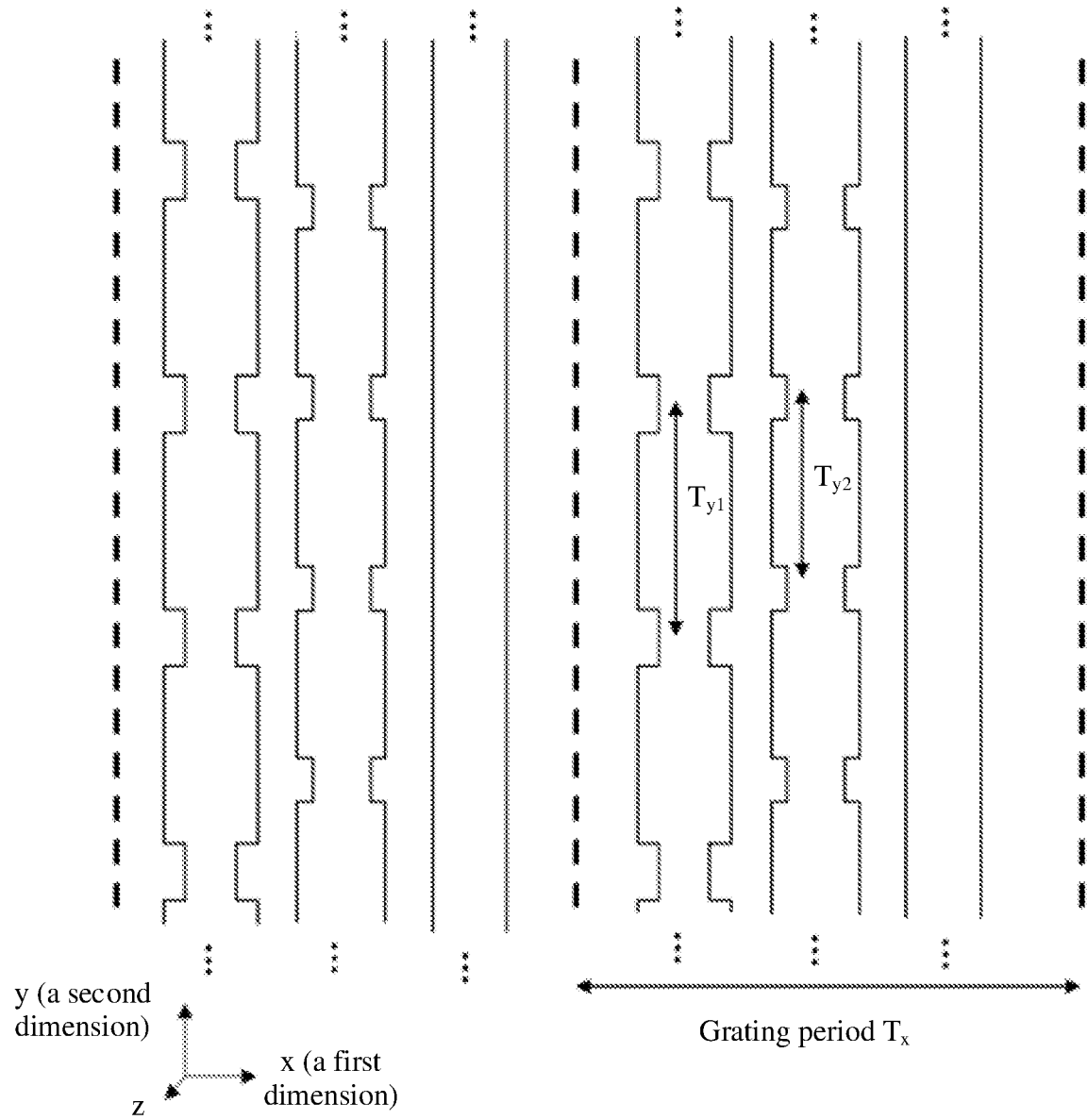
FIG. 3 is a schematic diagram of a structure of a diffractive optical element according to this application.

FIG. 3 is a schematic diagram of a structure of the diffractive optical element according to this application. In this example, a first dimension is a direction of an x axis, and a second dimension is a direction of a y axis. A grating component is periodically distributed in the first dimension. In this example, there are two grating components in the first dimension. It may also be understood that the grating components are periodically arranged in the first dimension. In other words, the grating component is a minimum repeatable unit in the first dimension, and a period size in the first dimension may be referred to as a grating period, and is denoted by Tx. The grating component includes three optical waveguides. The three optical waveguides include two optical waveguides that periodically change in the second dimension. The two optical waveguides have different structures. A period in the second dimension may be referred to as a waveguide period. A waveguide period of one optical waveguide may be denoted by $T_{y1}$, and a waveguide period of the other optical waveguide may be denoted by $T_{y2}$. In this example, $T_{y1}$ is different from $T_{y2}$. It should be understood that, in this example, a periodic change manner in the second dimension and structures of the two optical waveguides having different structures in the second dimension are merely examples, and may be in another manner. For details, refer to the following related descriptions. Details are not described herein again.

Light in a specific band may be selected based on the diffractive optical element by using the M optical waveguides that periodically change in the second dimension, that is, a narrowband response is implemented. A grating structure is formed by using the grating components periodically distributed in the first dimension, so that a function of adjusting reflection at an abnormal angle is implemented. In other words, reflection at an abnormal angle can be implemented by using higher-order diffraction of the grating structure. Further, diffraction efficiency of the reflection at an abnormal angle of the diffractive optical element can be enhanced in a specific band by using the diffractive optical element shown in FIG. 3.

It should be noted that the optical waveguide periodically changes in the second dimension (that is, in an extension direction of the optical waveguide). This periodic change may excite a waveguide mode in the optical waveguide when free-space light at a specific wavelength is incident, and implement phase matching with diffractive light of the free-space light, to form a leakage wave mode that can be efficiently reflected to free space. In this case, reflection efficiency is greatly enhanced (that is, a guided-mode resonance phenomenon). For other light at a wavelength that does not meet a phase matching condition, the reflection efficiency is very low. To be specific, after the incident light in the specific band interacts with the optical waveguide that periodically changes in the second dimension, the diffractive light can be reflected at a specific angle. In other words, a guided-mode resonance principle is used for the optical waveguide that periodically changes in the second dimension. After the incident light in the specific band interacts with the optical waveguide that periodically changes in the second dimension, the diffractive light is reflected at the specific angle (referred to as an abnormal angle). In addition, incident light at another wavelength does not has a similar response. Therefore, the narrowband response can be implemented. In other words, narrowband selection can be implemented. In addition, due to differences in waveguide sizes or resonance wavelengths, different optical waveguides in the grating component have different phase delays for the incident light, so that reflected light wavefront distribution at a specific angle can be formed.

The light in the specific band may be referred to as a narrowband, and a narrowband range may be, for example, less than 30 nanometers (nm), or less than 50 nm. Further, the incident light may be an optical band, for example, a visible light band, an infrared band, or an ultraviolet band; or may be terahertz, a microwave, radio, or the like. With reference to the formula 1, when an incident angle and a diffraction order are fixed, a longer wavelength of the incident light indicates a larger size (for example, the grating period of the grating component, a length of the optical waveguide, a width of the optical waveguide, and a thickness of the optical waveguide) of the diffractive optical element, and a larger size indicates a lower requirement for manufacturing precision. For example, when the incident light is light in a visible light band, the grating period may be not greater than 2 microns (μm).

In a possible implementation, the M optical waveguides that periodically change in the second dimension are configured to reflect the light in the specific band. It may also be understood that the M optical waveguides that periodically change in the second dimension are reflective optical waveguides in the specific band (the narrowband). The specific band may be, for example, 525 nm±5 nm. Further, optionally, an optical waveguide other than the M optical waveguides in the N optical waveguides may also perform phase adjustment on the incident light. In other words, the N optical waveguides may cause different phase delays to the incident light, to achieve a function of phase adjustment, thereby improving efficiency of diffractive light of a specific order and reducing efficiency of diffractive light of another order.

In a possible implementation, the first dimension is perpendicular to the second dimension. The first dimension may be a direction of the grating period, and the second dimension may be an extension direction of the optical waveguide. For example, the first dimension is the direction of the x axis, and the second dimension is the direction of the y axis. Refer to FIG. 3. This facilitates manufacture of the diffractive optical element and makes the response more even. It should be understood that the first dimension may also be approximately perpendicular to the second dimension.

In a possible implementation, a material of the optical waveguide may be a material that is transparent to visible light or that is not transparent to visible light and that can diffract light with a large incident angle, for example, silicon nitride, titanium oxide, silicon, silicon oxide, polymer, or metal. This is not limited in this application. It should be noted that when the incident light is in the visible light band, the material of the optical waveguide is usually a transparent material, for example, silicon nitride or titanium oxide. This helps improve transmittance of light. In addition, when the material of the optical waveguide is silicon nitride or titanium oxide, the diffractive optical element may be prepared in a mature semiconductor micro-nano preparation process. Therefore, mass production is easy. In addition, performance of materials such as silicon nitride or titanium oxide is stable, and the diffractive optical element may have stable performance as much as possible in different environmental conditions.

Figure 10A:
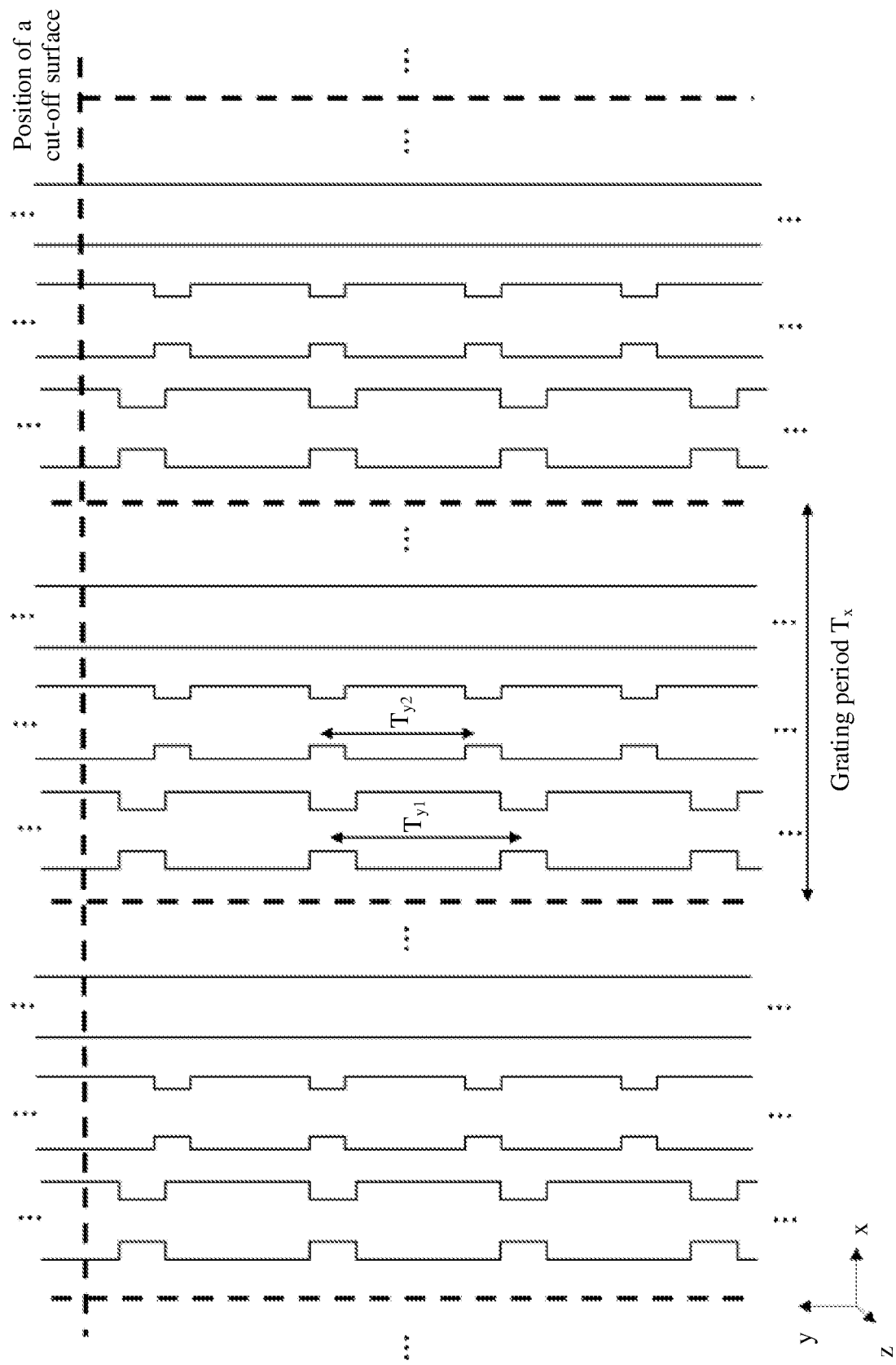
FIG. 10a is a top view of a structure of a diffractive optical element according to this application.
Figure 10B:
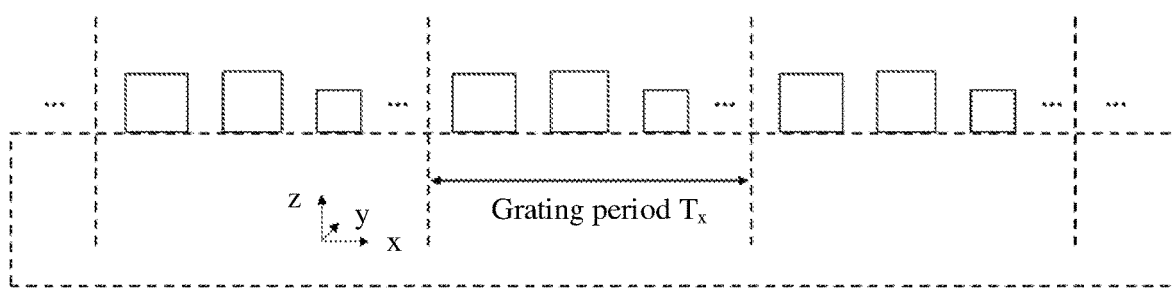
FIG. 10b is a side view of a structure of a diffractive optical element according to this application.

Further, optionally, a contour of a cross section of the optical waveguide may be a rectangle (as shown in FIG. 10b), a trapezoid, or any other regular or irregular shape.

In the second dimension, widths of the N optical waveguides included in the grating component may be the same or different. For another example, thicknesses of the N optical waveguides may be the same or different. Further, optionally, the thickness of the optical waveguide is not greater than 1 Further, optionally, the thickness of the optical waveguide is not greater than 300 nanometers (nm).

In a possible implementation, an acute angle formed between any two adjacent optical waveguides in the N optical waveguides is not greater than a preset angle. The preset angle may be, for example, 0 degrees, that is, the N optical waveguides are parallel to each other. For another example, the preset angle may be greater than 0 degrees and not greater than 10 degrees, that is, the N optical waveguides are approximately parallel to each other. In other words, the preset angle may be any angle not greater than 10 degrees, for example, 0 degrees, 0.5 degrees, 1 degree, 1.2 degrees, 3 degrees, or 10 degrees. It may also be understood that any two adjacent optical waveguides in the N optical waveguides are parallel or approximately parallel to each other. In this way, more optical waveguides can be disposed in the grating component, and the more optical waveguides can more flexibly adjust a light field.

Further, optionally, the optical waveguides having different structures in the M optical waveguides that periodically change in the second dimension correspond to different resonance wavelengths of guided-mode resonance. In other words, M optical waveguides having different structures correspond to M resonance wavelengths. In this way, M bands can be selected. For example, this is applicable to a scenario in which multi-wavelength selection is required, for example, color display.

The following separately describes structures of the diffractive optical element shown in FIG. 3 in the two dimensions, to provide an example of a specific implementation solution.

1. Structure in the Second Dimension

In a possible implementation, the M optical waveguides in the N optical waveguides included in the grating component periodically change in the second dimension. At least two of the M optical waveguides that periodically change in the second dimension have different structures.

The following shows three possible implementations of optical waveguides having different structures as examples.

In an implementation 1, the at least two of the M optical waveguides that periodically change in the second dimension have different periodic change manners. In an implementation 2, the at least two of the M optical waveguides that periodically change in the second dimension have different periods. In an implementation 3, the at least two of the M optical waveguides that periodically change in the second dimension have different shapes. It should be understood that, that the at least two optical waveguides have different structures may also be a combination of the foregoing three implementations. For ease of description of the solution, two of the M optical waveguides are used as an example for description. For example, the two optical waveguides have different periods and different periodic change manners. For another example, the two optical waveguides have different periods and different shapes. For still another example, the two optical waveguides have different periodic change manners and different shapes. For yet another example, the two optical waveguides have different periods, different periodic change manners, and different shapes.

In a possible implementation, a period (for example, $T_y$) of each of the M optical waveguides that periodically changes in the second dimension is less than a center wavelength of the operating band. For example, the period $T_y$ of the optical waveguide in the second dimension ranges from 0.2 μm to 0.4 μm.

The following shows five possible periodic change manners as examples.

Manner 1: The optical waveguide has a periodic protruding portion or a periodic recessed portion.

Figure 4A:
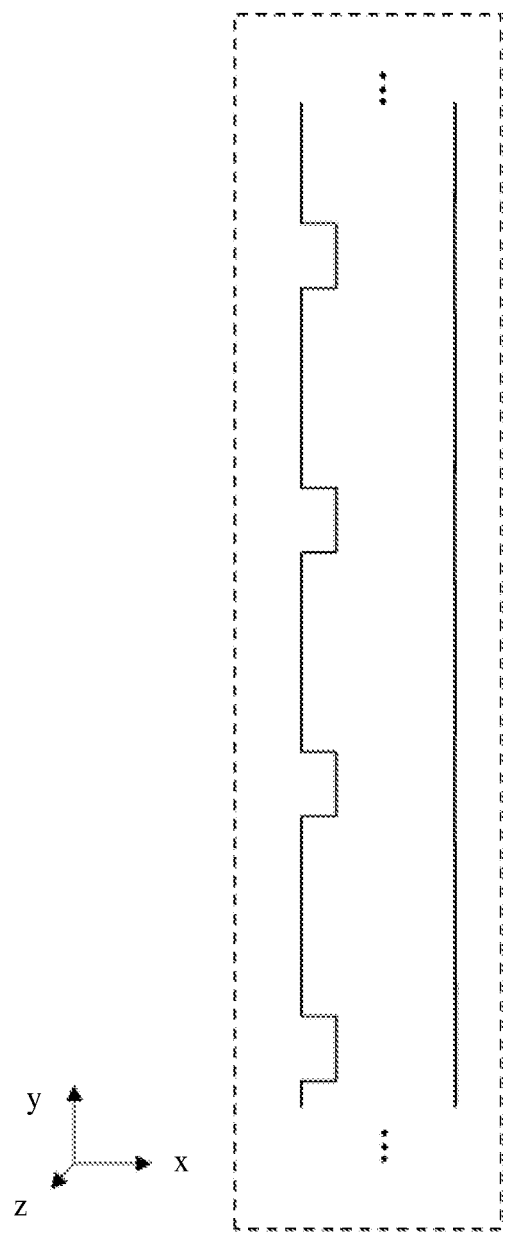
FIG. 4a is a schematic diagram of a structure of a periodic recessed portion of an optical waveguide according to this application.

In a possible implementation, in the second dimension, a top or a side wall of the optical waveguide has the periodic recessed portion or the periodic protruding portion. FIG. 4a is a schematic diagram of a structure of a periodic recessed portion of an optical waveguide according to this application. The recessed portion is located on a side wall of the optical waveguide. In this periodic change manner of the optical waveguide, a width of the optical waveguide periodically changes in an extension direction (that is, a second dimension) of the optical waveguide. It should be understood that, in FIG. 4a, an example in which the recessed portion is located on a left side wall of the optical waveguide is used, and the recessed portion may also be a right side wall of the optical waveguide.

Figure 4B:
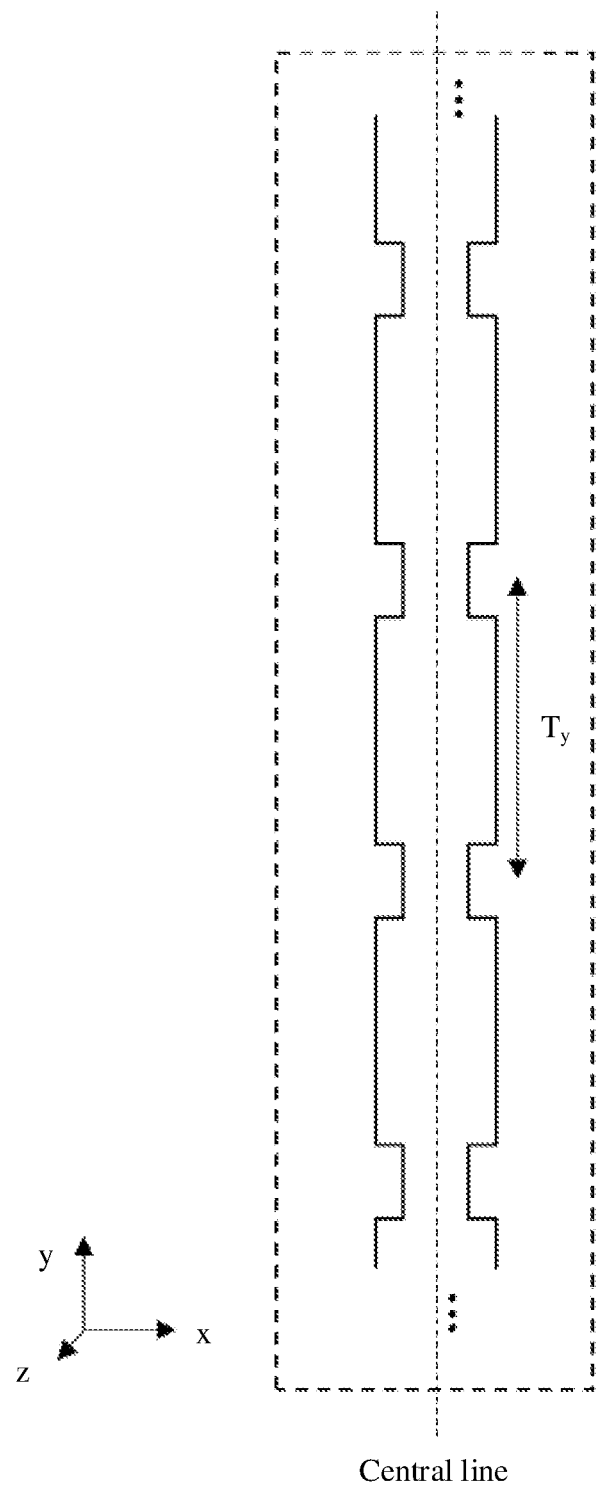
FIG. 4b is a schematic diagram of another structure of a periodic recessed portion of an optical waveguide according to this application.

FIG. 4b is a schematic diagram of another structure of a periodic recessed portion of an optical waveguide according to this application. The recessed portion is located on two side walls of the optical waveguide. In this periodic change manner of the optical waveguide, a width of the optical waveguide periodically changes in an extension direction (that is, a second dimension) of the optical waveguide. It should be understood that FIG. 4b uses an example in which recessed portions located on two side walls are symmetric about a central line of the optical waveguide. The central line of the two recessed portions of the optical waveguide may also be asymmetric. For example, the two recessed portions may have a same period but different degrees of recession. Alternatively, the two recessed portions may have a same period and a same degree of recession but have displacement in the second dimension. In other words, the recessed portions on the two side walls are not strictly aligned (refer to the following FIG. 9c).

It should be noted that when a top of the optical waveguide has the periodic recessed portion or the periodic protruding portion, a thickness of the optical waveguide periodically changes in the extension direction of the optical waveguide.

It should be further noted that, the optical waveguide may periodically change in a manner of abrupt change, for example, in a rectangular sawtooth shape shown in FIG. 4a or FIG. 4b. Alternatively, the optical waveguide may periodically change in a manner of gradual change, for example, in a triangular sawtooth shape, a winding concave-convex shape, a semi-circle protruding shape, or a semi-circle recessed shape. It should be understood that any shape that can be implemented by using a micro-nano preparation process may be used.

In the manner 1, the diffractive optical element is applicable to a scenario in which a narrowband (or referred to as a filtering band) that requires a response is narrow. For example, the diffractive optical element is applicable to light in a wide band emitted by a light source, but a high-resolution optical imaging system in a narrowband is required.

Manner 2: The optical waveguide has a periodic gap.

Figure 5:
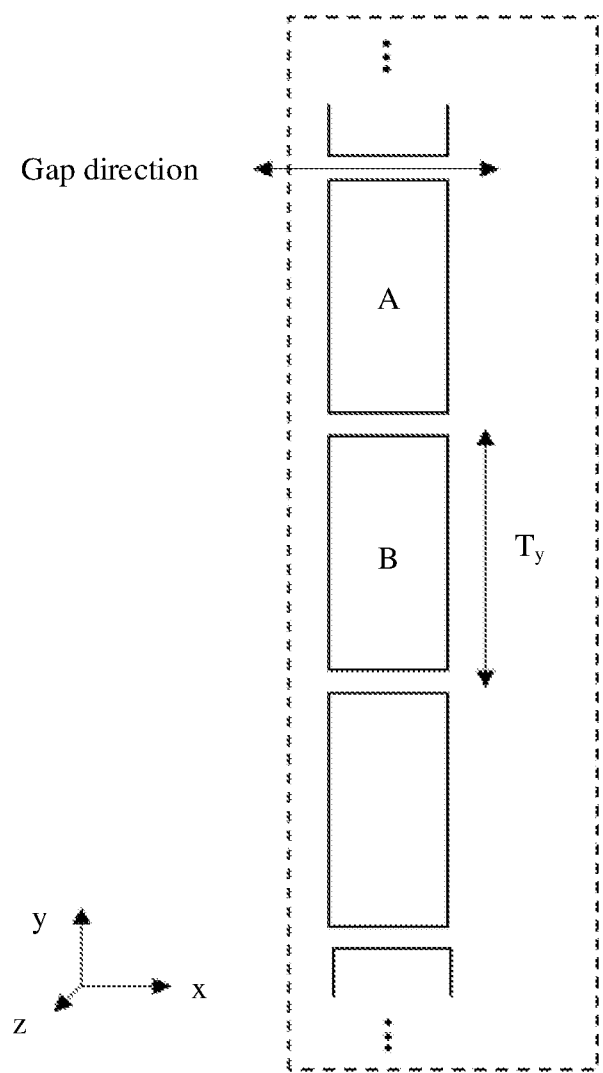
FIG. 5 is a schematic diagram of a structure of a periodic gap of an optical waveguide according to this application.

In a possible implementation, in the second dimension, the optical waveguide has the periodic gap. It may also be understood that in the second dimension, the optical waveguide is periodically cut off, to form the gap between two adjacent cut-off surfaces. A direction of the gap may be understood as a cut-off direction. FIG. 5 is a schematic diagram of a structure of a periodic gap of an optical waveguide according to this application. A length of the gap of the optical waveguide in a second dimension should be controlled within a specific range. For example, the length of the gap in the second dimension meets that incident light is capable of being coupled between two adjacent parts (for example, A and B in FIG. 5) of the optical waveguide to form a waveguide mode. This can implement guided-mode resonance, thereby implementing high diffraction efficiency and selecting a narrowband.

For example, the length of the gap in the second dimension is not greater than a center wavelength of an operating band. Further, the length of the gap in the second dimension is less than a half of the center wavelength of the operating band, so that a light field between the two adjacent parts of the waveguide is capable of being coupled to form the waveguide mode.

Further, optionally, an included angle between the direction of the gap of the optical waveguide and the first dimension is less than 90 degrees. For example, the included angle between the direction of the gap of the optical waveguide and the first dimension is 0 degrees (refer to FIG. 5). For another example, the included angle between the direction of the gap of the optical waveguide and the first dimension is 45 degrees. For still another example, the included angle between the direction of the gap of the optical waveguide and the first dimension is any angle in (0, 45°). For yet another example, the included angle between the direction of the gap of the optical waveguide and the first dimension is any angle in (45, 90°). It should be understood that, when the included angle between the direction of the gap of the optical waveguide and the first dimension is any angle in (0, 90°), the direction of the gap of the optical waveguide is tilted.

In the manner 2, the diffractive optical element is applicable to a scenario in which a requirement for a narrowband filtering function is not high, for example, an imaging system in which a light source is a narrowband light source. In addition, a low requirement is imposed on process precision, so that the diffractive optical element can be easily prepared.

Manner 3: The optical waveguide includes periodically distributed small holes, where the small hole is hollow or filled with a material whose refractive index is different from that of a material of the optical waveguide.

Figure 6:
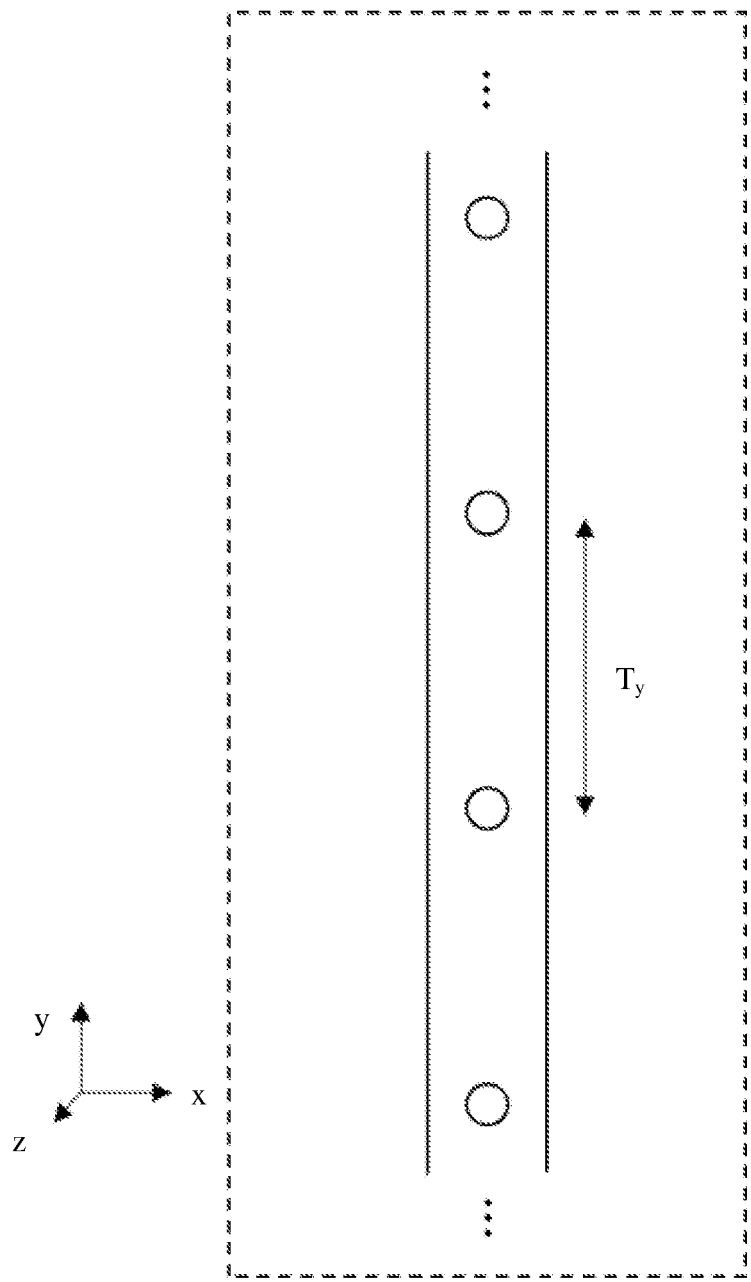
FIG. 6 is a schematic diagram of a structure of an optical waveguide including periodically distributed small holes according to this application.

In a possible implementation, in the second dimension, the optical waveguide has the periodically distributed small holes. FIG. 6 is a schematic diagram of a structure of an optical waveguide including periodically distributed small holes according to this application. The small hole may be hollow, that is, the optical waveguide is hollowed out at a corresponding position. Alternatively, the small hole may be filled with a material whose refractive index is different from that of a material of the optical waveguide, for example, silicon oxide.

It should be noted that a shape of the small hole includes but is not limited to a circle, a square, a triangle, and the like, and any shape that can be implemented by using a micro-nano preparation process may be used.

In the manner 3, the diffractive optical element is applicable to a scenario requiring a narrow filtering band. For example, the diffractive optical element is applicable to light in a wide band emitted by a light source, but a high-resolution optical imaging system in a narrowband is required.

Manner 4: Periodically distributed diffraction structures (or referred to as micro-nano structures) are in contact with the optical waveguide, or distances between the periodically distributed diffraction structures and the optical waveguide each do not exceed a preset distance.

In a possible implementation, in a second dimension, the periodically distributed diffraction structures are in contact with the optical waveguide, or the distances between the periodically distributed diffraction structures and the optical waveguide each do not exceed the preset distance. In other words, the periodically distributed diffraction structures are disposed at a position adjacent to the optical waveguide or on the optical waveguide. It may also be understood that the periodically distributed diffraction structures are disposed on the optical waveguide, at a position whose distance from the optical waveguide is equal to the preset distance, or at a position whose distance from the optical waveguide is less than the preset distance, and the diffraction structure is periodically distributed in the second dimension. The diffraction structure may be periodically disposed at a top, one side wall, or two side walls of the optical waveguide. Alternatively, the diffraction structure may be periodically disposed near the top, one side wall, or two side walls of the optical waveguide, and a distance between the diffraction structure and one side wall of the optical waveguide does not exceed the preset distance.

Further, optionally, the preset distance between the diffraction structure and the optical waveguide needs to meet that a light field formed in the optical waveguide spatially overlaps the diffraction structure. In other words, the diffraction structure may interact with the light field in a waveguide mode in the optical waveguide. For example, the preset distance between the diffraction structure and the optical waveguide is not greater than a center wavelength (for example, 525 nm) of an operating band. Further, the preset distance between the diffraction structure and the optical waveguide may be less than a quarter of the center wavelength of the operating band. It should be understood that when light is propagated within a preset distance range outside the optical waveguide, the light may be referred to as an evanescent wave.

In a possible implementation, a shape of the diffraction structure may be a circle, a square, a rectangle, a triangle, or the like. Any shape that can be implemented by using a semiconductor micro-nano process may be used. This is not limited in this application.

In a possible implementation, a material of the diffraction structure may be, for example, silicon nitride, titanium oxide, silicon, silicon oxide, polymer, or metal.

In a possible implementation, a maximum size of the diffraction structure is not greater than a width of the optical waveguide. For example, the diffraction structure is a circle, and a diameter of the diffraction structure is not greater than the width of the optical waveguide. For another example, the diffraction structure is a square, and a side length of the diffraction structure is not greater than the width of the optical waveguide. For still another example, the diffraction structure is a rectangle, and a short side of the diffraction structure is not greater than the width of the optical waveguide.

Figure 7A:
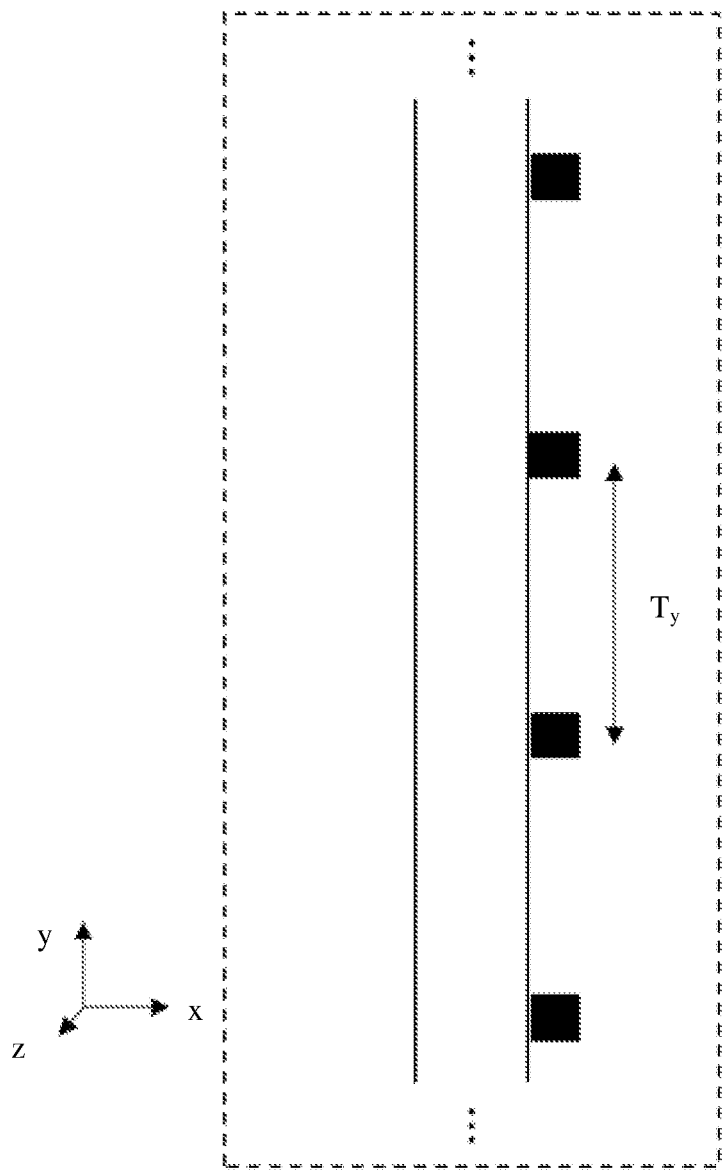
FIG. 7a is a schematic diagram of position relationships between periodically distributed diffraction structures and an optical waveguide according to this application.

FIG. 7a is a schematic diagram of a structure in which periodically distributed diffraction structures are adjacent to an optical waveguide according to this application. In this example, the diffraction structure is located at a position adjacent to a side wall of the optical waveguide, and the diffraction structure is in a square shape.

Figure 7B:
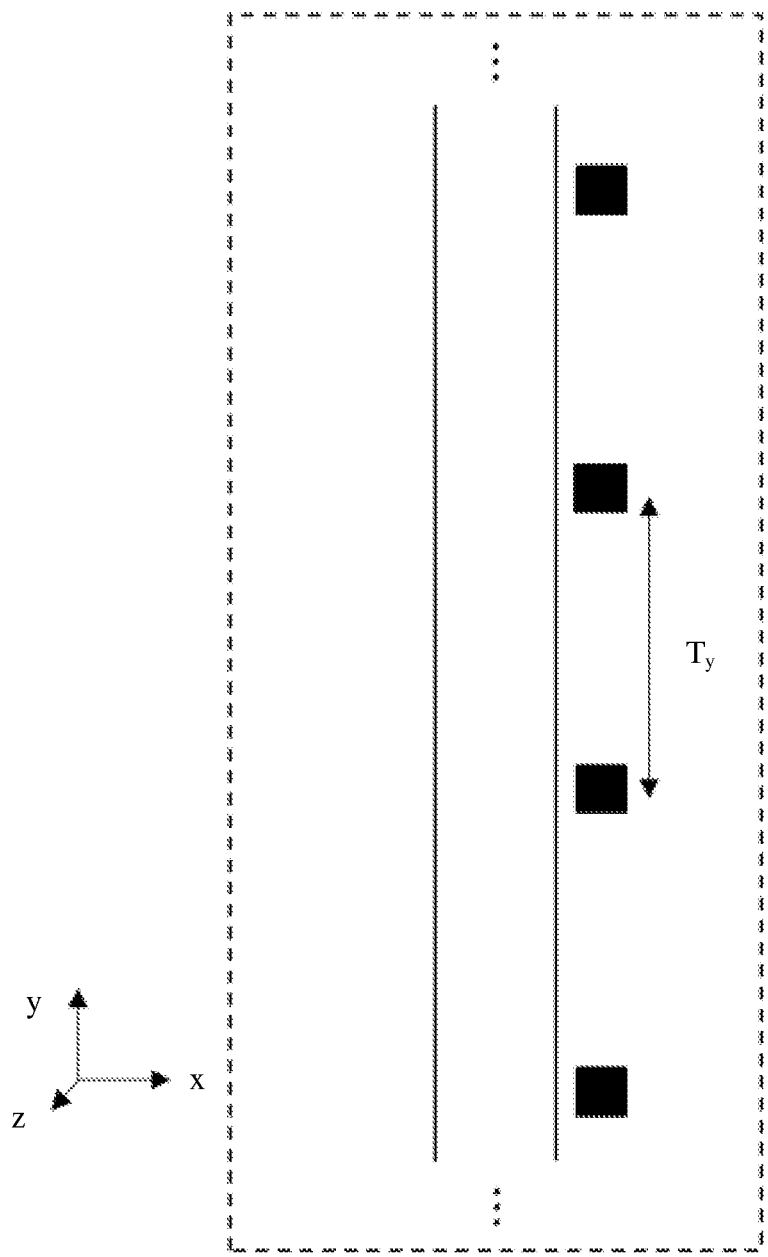
FIG. 7b is a schematic diagram of a structure of contact between periodically distributed diffraction structures and the optical waveguide according to this application.

FIG. 7b is a schematic diagram of a structure of contact between periodically distributed diffraction structures and an optical waveguide according to this application. In this example, the diffraction structure is located at a side wall of the optical waveguide. In other words, the diffraction structure is in contact with the optical waveguide, and the diffraction structure is in a square shape.

Figure 7C:
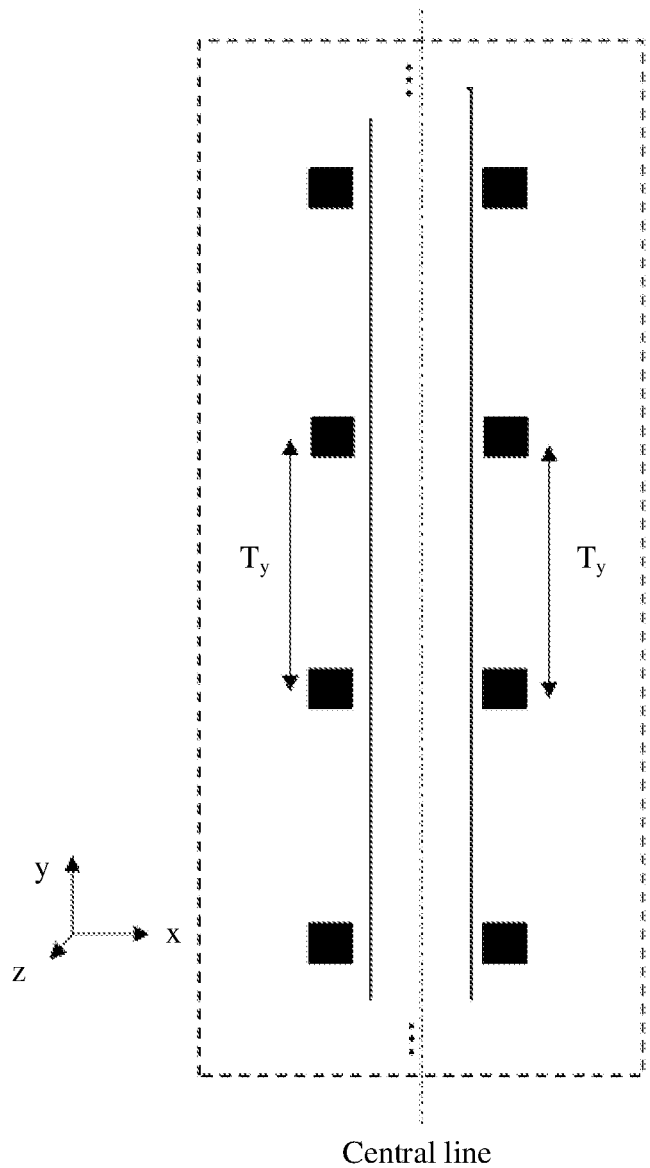
FIG. 7c is a schematic diagram of another position relationships between periodically distributed diffraction structures and an optical waveguide according to this application.

FIG. 7c is a schematic diagram of another structure in which periodically distributed diffraction structures are adjacent to the optical waveguide according to this application. In this example, the diffraction structure is located near two side walls of the optical waveguide, and the diffraction structure is in a square shape. It should be noted that the diffraction structures located near two sides of the optical waveguide may be symmetric about a central line of the optical waveguide.

Figure 7D:
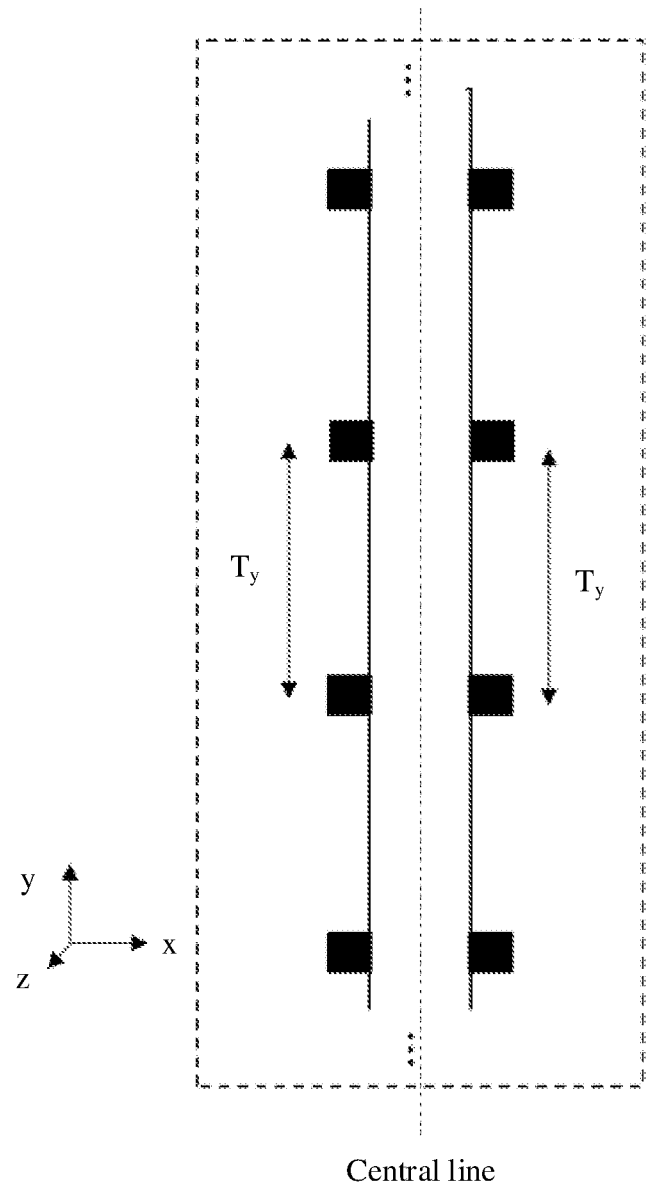
FIG. 7d is a schematic diagram of another structure of contact between periodically distributed diffraction structures and the optical waveguide according to this application.
Figure 7E:
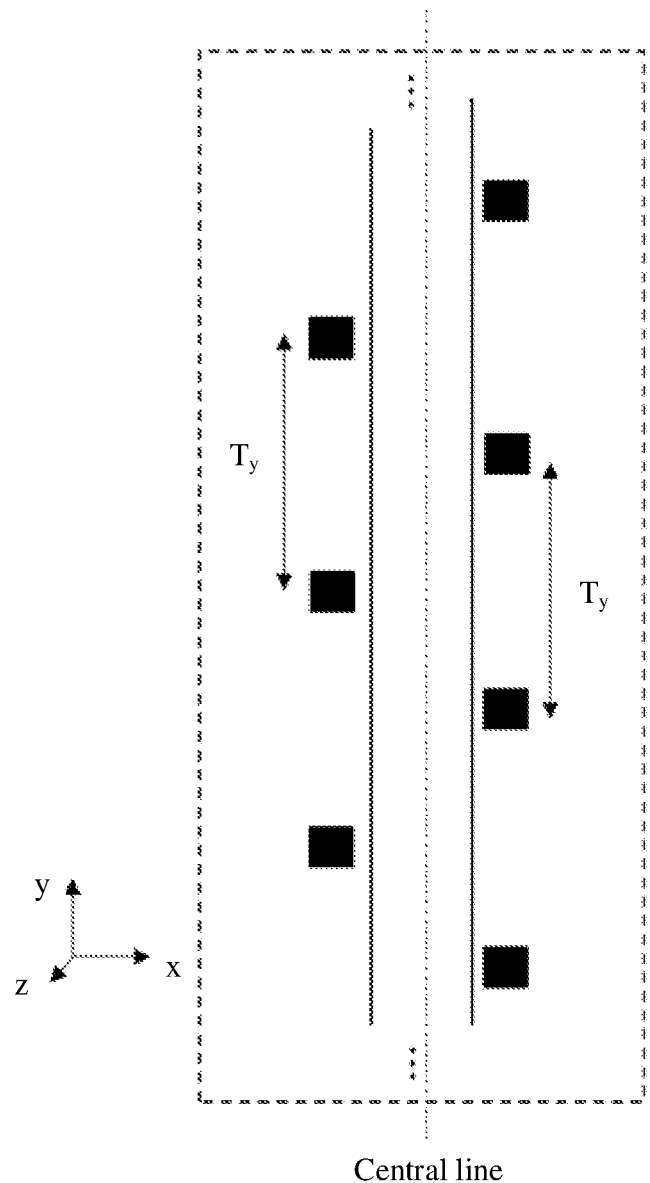
FIG. 7e is a schematic diagram of still another position relationships between periodically distributed diffraction structures and an optical waveguide according to this application.

FIG. 7d is a schematic diagram of another structure of contact between periodically distributed diffraction structures and an optical waveguide according to this application. In this example, the diffraction structure is in contact with two side walls of the optical waveguide, and the diffraction structure is in a square shape. It should be noted that the diffraction structures in contact with two sides of the optical waveguide may be symmetric about a central line of the optical waveguide.

It should be noted that the diffraction structures near the two sides of the optical waveguide may be asymmetric about the central line of the optical waveguide. For example, the diffraction structures near the two side walls have a same waveguide period, but are at different distances from the optical waveguide. For example, the diffraction structure at a left side is closer to the optical waveguide than the diffraction structure at a right side. Alternatively, the diffraction structure at the right side is closer to the optical waveguide than the diffraction structure at the left side. Alternatively, the diffraction structures near the two side walls may have a same waveguide period, but displacement exists in the second dimension. In other words, the diffraction structures near the two side walls are not strictly aligned (refer to FIG. 7e).

In the manner 4, the diffractive optical element is applicable to a scenario in which a narrowband (or referred to as a filtering band) that requires a response is narrow. For example, the diffractive optical element is applicable to light in a wide band emitted by a light source, but a high-resolution optical imaging system in a narrowband is required. Alternatively, the diffractive optical element is applicable to a scenario in which a requirement for a narrowband filtering function is not high, for example, an imaging system in which a light source is a narrowband light source. In addition, a low requirement is imposed on process precision, so that the diffractive optical element can be easily prepared.

Manner 5: The refractive index of the optical waveguide periodically changes.

Figure 8:
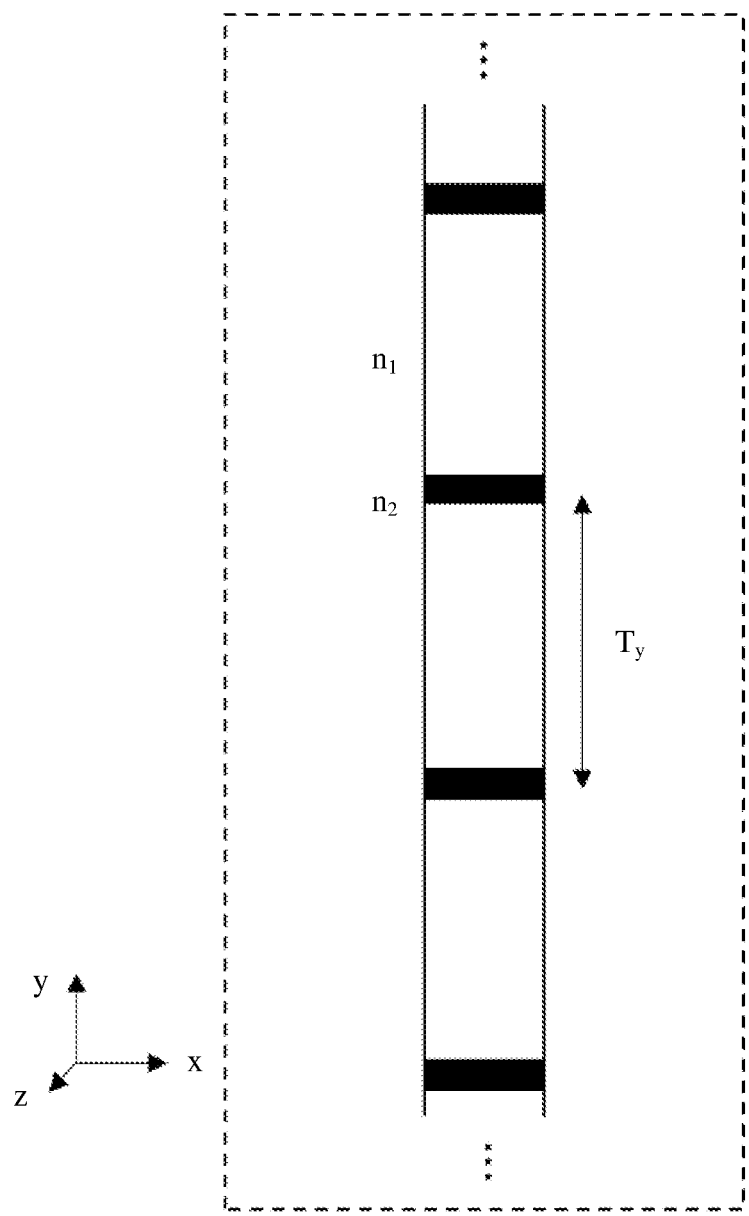
FIG. 8 is a schematic diagram of a structure of a refractive index that periodically changes of an optical waveguide according to this application.

In a possible implementation, in the second dimension, the refractive index of the optical waveguide periodically changes. Refer to FIG. 8. The optical waveguide is made of at least two materials with different refractive indexes, and refractive indexes n1 and n2 of the two materials are staggered and periodically change.

Further, optionally, the refractive index of the optical waveguide may periodically change through doping on the optical waveguide, or may be formed by inserting a material with a different refractive index from that of the optical waveguide into the optical waveguide.

In the manner 5, the diffractive optical element is applicable to a scenario in which a narrowband (or referred to as a filtering band) that requires a response is narrow. For example, the diffractive optical element is applicable to light in a wide band emitted by a light source, but a high-resolution optical imaging system in a narrowband is required. Alternatively, the diffractive optical element is applicable to a scenario in which a requirement for a narrowband filtering function is not high, for example, an imaging system in which a light source is a narrowband light source. In addition, the refractive index of the optical waveguide may periodically change through doping, and a low requirement is imposed on process precision, so that the diffractive optical element can be easily prepared.

In a possible implementation, at least one of the M optical waveguides that periodically change in the second dimension has at least two different waveguide periods. For ease of solution description, the following describes an example in which an optical waveguide periodically changes in a second dimension and the optical waveguide has two different waveguide periods.

It should be noted that in the foregoing manner 1 to manner 5, an example in which one optical waveguide has one waveguide period is used for description. A periodic change of the optical waveguide is located at a top or a side wall, and may be described in the following two cases.

Case 1: The periodic change of the optical waveguide is located at the top of the optical waveguide.

In the case 1, a top of at least one of M optical waveguides that periodically change in the second dimension has at least two different waveguide periods.

Figure 9A:
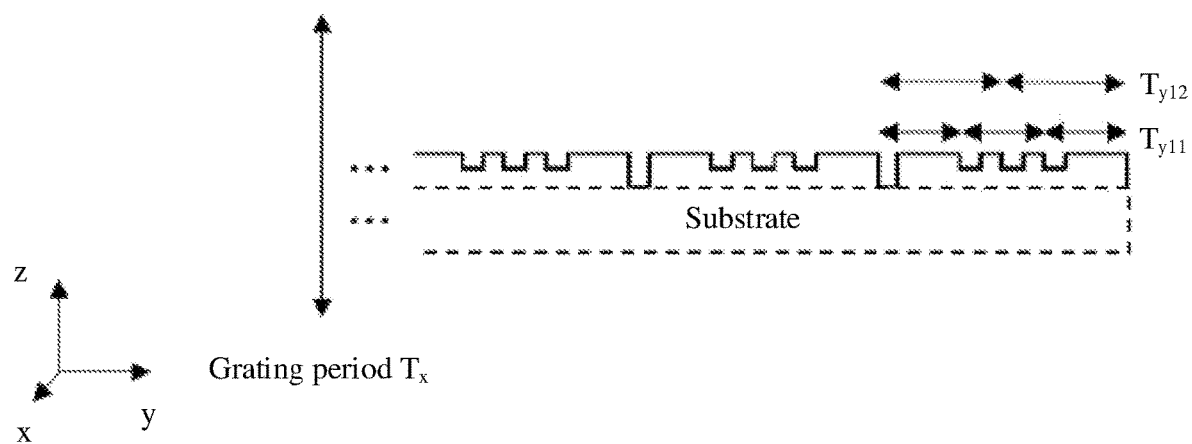
FIG. 9a is a schematic diagram of a structure of an optical waveguide that has at least two different waveguide periods in a second dimension according to this application.

In the foregoing periodic change manner 1, FIG. 9a is a schematic diagram of a cross section of an optical waveguide that has at least two different waveguide periods in a second dimension according to this application. A recessed portion of the optical waveguide is located on a top of the optical waveguide. The optical waveguide has two different waveguide periods, respectively $T_{y11}$ and $T_{y12}$, in the second dimension. This can implement narrowband responses to two wavelengths on a same optical waveguide. It should be understood that FIG. 9a is a side view of the optical waveguide. For example, a bottom of the optical waveguide is disposed on a substrate.

When a periodic change manner of the optical waveguide is the foregoing manner 2, manner 3, manner 4, or manner 5, at least one of the M optical waveguides that periodically change in the second dimension may also be designed to have at least two different periods. In other words, the periodic change manner in the second dimension may be replaced. Details are not described herein again. For details, refer to the manner in FIG. 9a.

Case 2: The periodic change of the optical waveguide is located at the side wall of the optical waveguide.

In the case 2, the following four cases may be described in detail.

Case 2.1: The optical waveguide has two different waveguide periods at each side.

Figure 9B:
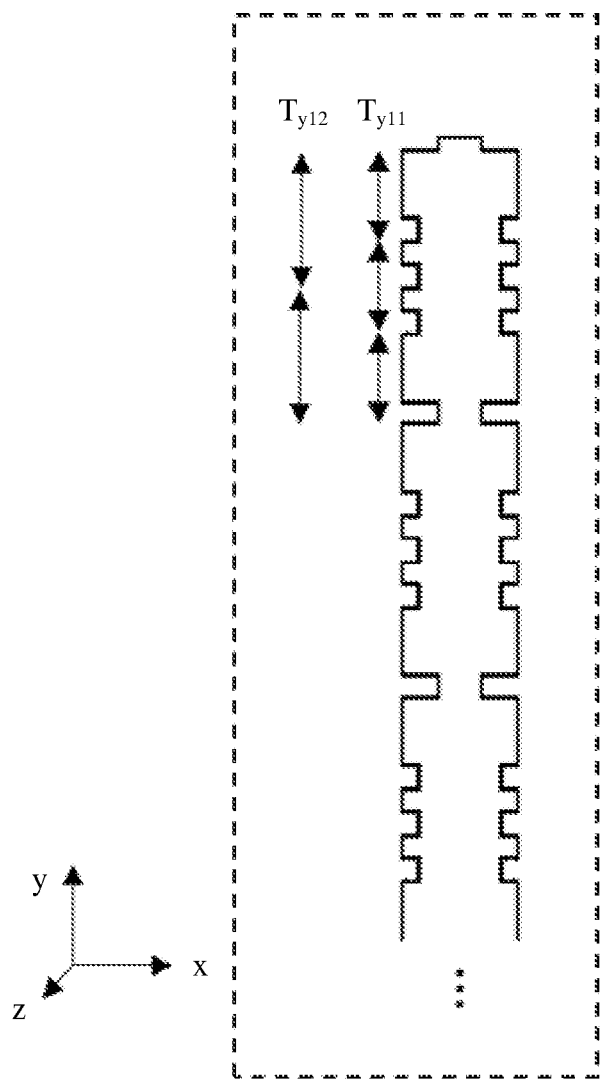
FIG. 9b is a schematic diagram of another structure of an optical waveguide that has two different waveguide periods in a second dimension according to this application.

In the foregoing periodic change manner 1, the optical waveguide has two different waveguide periods at each side. FIG. 9b is a schematic diagram of another structure of an optical waveguide that has two different waveguide periods in a second dimension according to this application. A recessed portion of the optical waveguide is located on two side walls of the optical waveguide, and is symmetric about a central line of the optical waveguide. Each side wall of the optical waveguide has two different waveguide periods, respectively $T_{y11}$ and $T_{y12}$, in the second dimension. This can implement a function of selecting two wavelengths on a same optical waveguide.

Figure 9C:
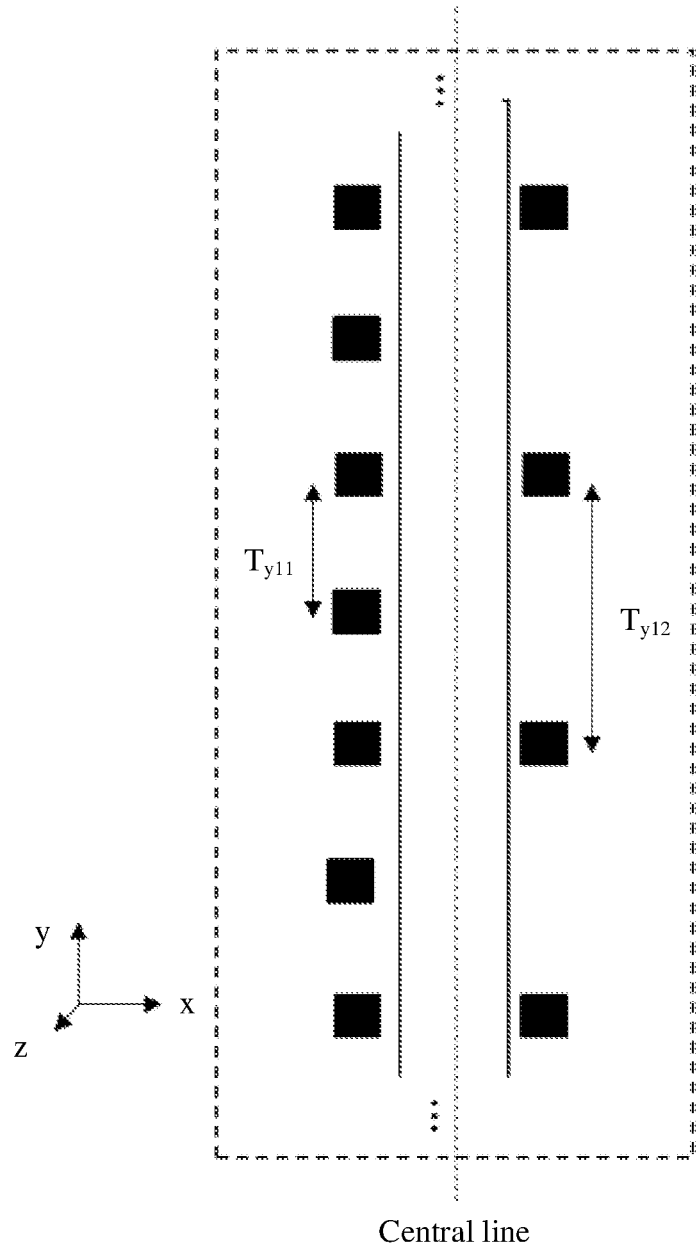
FIG. 9c is a schematic diagram of still another structure of an optical waveguide that has at least two different waveguide periods in a second dimension according to this application.
Figure 9D:
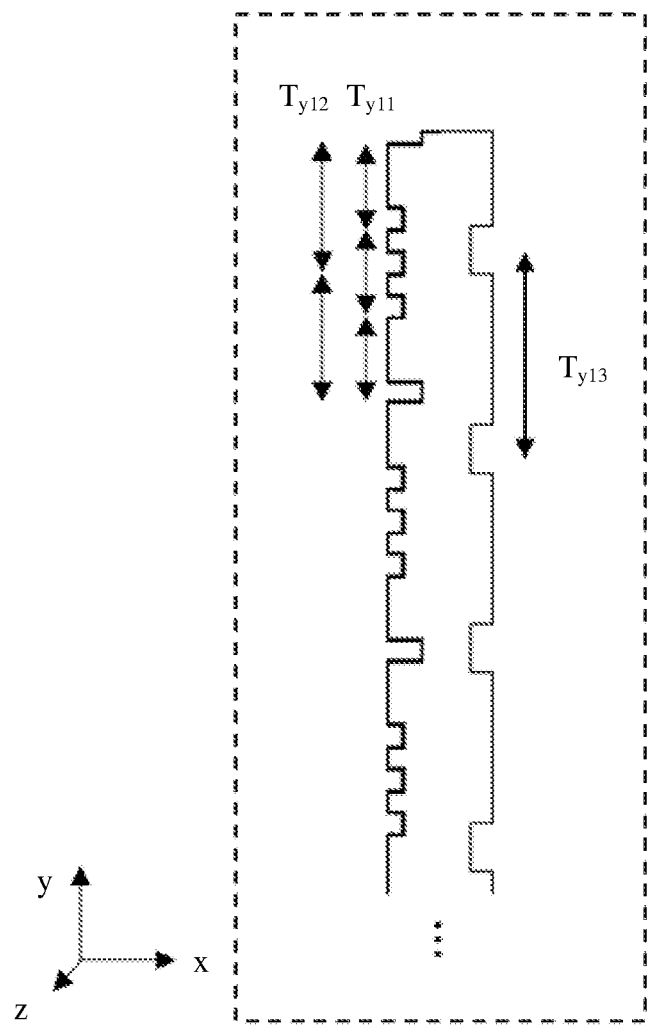
FIG. 9d is a schematic diagram of yet another structure of an optical waveguide that has at least two different waveguide periods in a second dimension according to this application.
Figure 9E:
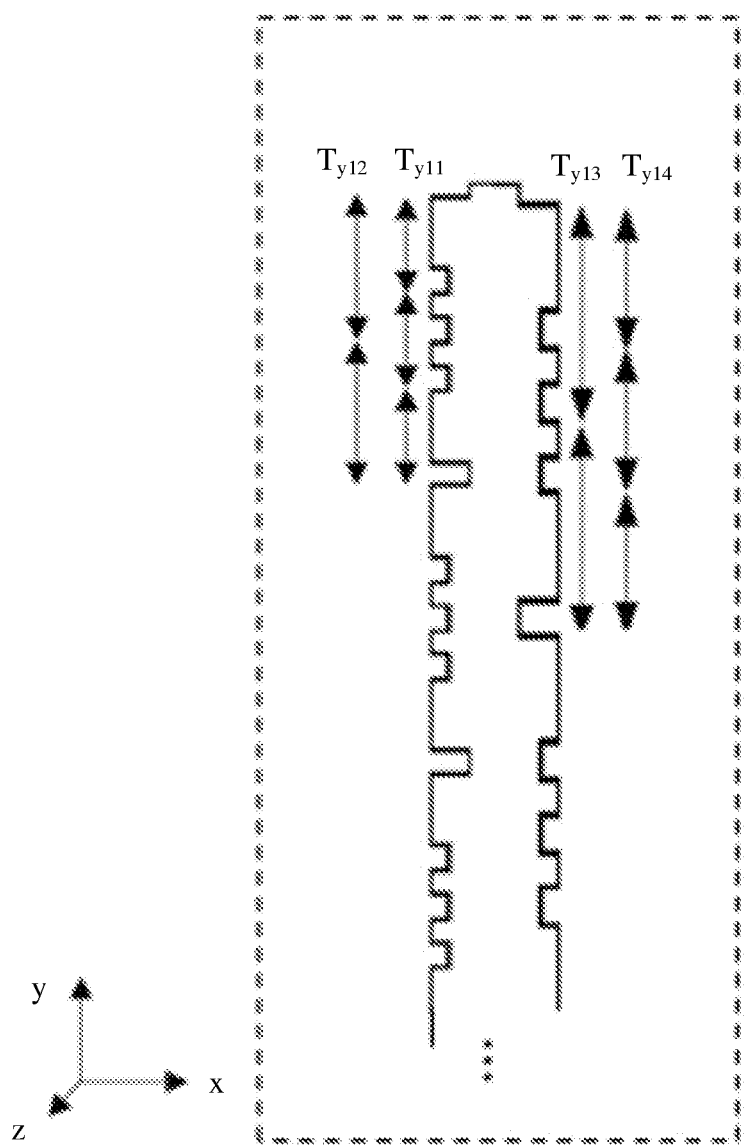
FIG. 9e is a schematic diagram of still yet another structure of an optical waveguide that has at least two different waveguide periods in a second dimension according to this application.
Figure 9F:
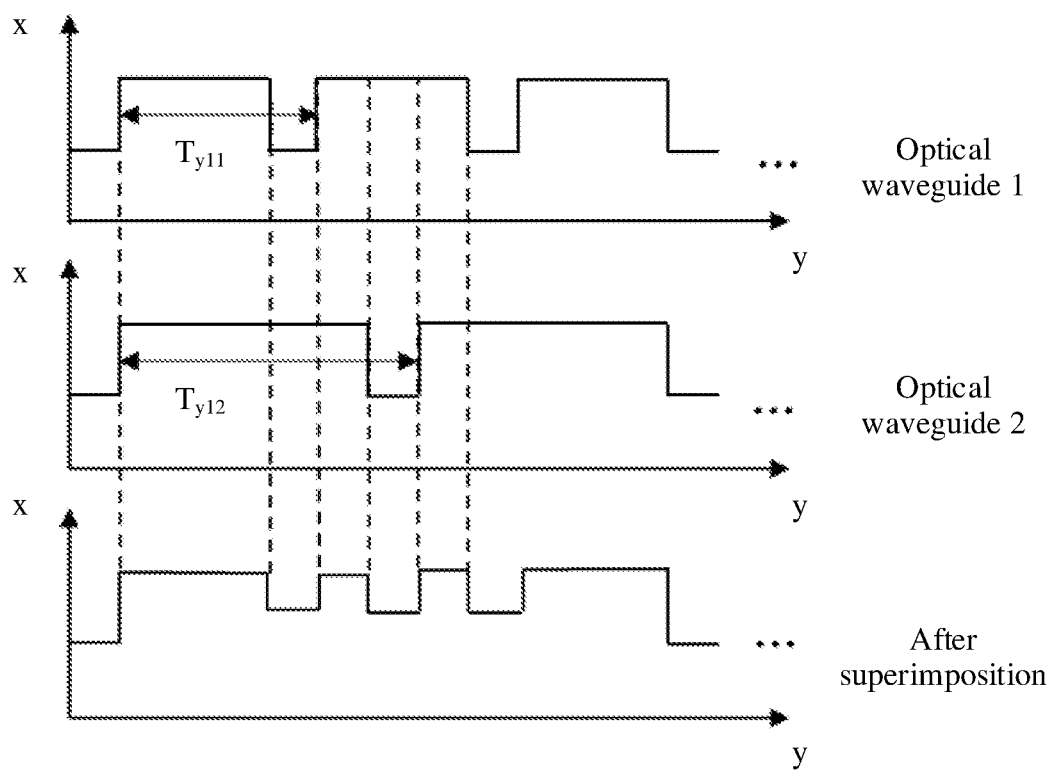
FIG. 9f is a schematic diagram of a forming principle of an optical waveguide that has two different waveguide periods in a second dimension according to this application.

It may also be understood that, FIG. 9b is obtained by superimposing an optical waveguide 1 on an optical waveguide 2 in FIG. 9f. The optical waveguide 1 has a period ($T_{y11}$) in the second dimension, that is, a recessed point appears at a spacing of $T_{y11}$ on the optical waveguide 1. The optical waveguide 2 also has a period ($T_{y12}$) in the second dimension, that is, a recessed point appears at a spacing of $T_{y12}$ on a width of the optical waveguide 2. After the optical waveguide 1 and the optical waveguide 2 are superimposed, the optical waveguide shown in FIG. 9b is formed. In other words, the recessed point appears at the spacing of $T_{y11}$, and the recessed point appears at the spacing of $T_{y12}$.

When a change manner of the optical waveguide is the foregoing manner 2, manner 3, manner 4, and manner 5, at least one of the M optical waveguides that periodically change in the second dimension may also be designed to have at least two different waveguide periods. In other words, the periodic change manner in the second dimension may be replaced. Details are not described herein again. For details, refer to FIG. 9b.

Case 2.2: The optical waveguide has one waveguide period at each of two sides, and the two waveguide periods at the two sides are different.

In the foregoing periodic change manner 5, the optical waveguide has one waveguide period at each of two sides, and the two waveguide periods at the two sides are different. It may also be understood that a diffraction structure is asymmetric about a central line of the optical waveguide. FIG. 9c is a schematic diagram of still another structure of an optical waveguide that has at least two different waveguide periods in a second dimension according to this application. The diffraction structure is located at two side walls of the optical waveguide. One side wall corresponds to one waveguide period. A waveguide period of a left side wall is $T_{y11}$, and a waveguide period of a right side wall is $T_{y12}$. This can implement a narrowband response function to two wavelengths on a same optical function waveguide.

It should be understood that the waveguide periods of the two side walls of the optical waveguide may meet that the waveguide period at the left is greater than the waveguide period at the right (that is, $T_{y11} > T_{y12}$), or the waveguide period at the right is greater than the waveguide period at the left ($T_{y12} > T_{y11}$).

When a periodic change manner of the optical waveguide is the foregoing manner 1, manner 2, manner 3, and manner 4, at least one of the M optical waveguides that periodically change in the second dimension may be designed to have at least two different waveguide periods similar to that in the case 2.2. In other words, the periodic change manner in the second dimension may be replaced. Details are not described herein again. For details, refer to FIG. 9c.

Case 2.3: The optical waveguide has two waveguide periods at one side, and the two waveguide periods are different. The optical waveguide has one waveguide period at the other side, and the waveguide period may be the same as any one of the two waveguide periods at the opposite side or different.

In the foregoing periodic change manner 1, the optical waveguide has two waveguide periods at one side, and the two waveguide periods are different. The optical waveguide has one waveguide period at the other side. FIG. 9d is a schematic diagram of yet another structure of an optical waveguide that has at least two different waveguide periods in a second dimension according to this application. A recessed portion of the optical waveguide is located on two side walls of the optical waveguide, and the two side walls are asymmetric about a central line of the optical waveguide. The recessed portion on one side of the optical waveguide has two different waveguide periods, respectively $T_{y11}$ and $T_{y12}$, in the second dimension. The recessed portion on the other side has a waveguide period $T_{y11}$. $T_{y11}$ may be the same as either of $T_{y11}$ and $T_{y12}$, or may be different from both $T_{y11}$ and $T_{y12}$. This can select at least two wavelengths on a same optical waveguide. If $T_{y13}$ is the same as any one of $T_{y11}$ and $T_{y12}$, two wavelengths can be filtered. If $T_{y13}$ is different from $T_{y11}$ and $T_{y12}$, three wavelengths can be filtered, that is, three wavelengths are selected.

Further, optionally, $T_{y11}:T_{y12}=2:3$.

When a periodic change manner of the optical waveguide is the foregoing manner 2, manner 3, manner 4, and manner 5, at least one of the M optical waveguides that periodically change in the second dimension may be designed to have at least two different waveguide periods similar to that in the case 2.3. In other words, the periodic change manner in the second dimension may be replaced. For details, refer to FIG. 9d.

Case 2.4: The optical waveguide has two waveguide periods at one side, and the two waveguide periods are different. The optical waveguide also has two waveguide periods at the other side, and at least one of the two waveguide periods is different from any one of the two waveguide periods at the opposite side.

In the foregoing periodic change manner 1, the optical waveguide has two waveguide periods at one side of the optical waveguide, and the two waveguide periods are different. The optical waveguide also has two waveguide periods at the other side, and at least one of the two waveguide periods is different from any one of the two waveguide periods at the opposite side. FIG. 9e is a schematic diagram of still yet another structure of an optical waveguide that has at least two different waveguide periods in a second dimension according to this application. A recessed portion of the optical waveguide is located on two side walls of the optical waveguide, and the two sides are asymmetric about a central line of the optical waveguide. The recessed portion on one side of the optical waveguide has two different waveguide periods, respectively $T_{y11}$ and $T_{y12}$, in the second dimension. The recessed portion on the other side also has two waveguide periods, respectively $T_{y13}$ and $T_{y14}$. At least one of $T_{y11}$ and $T_{y14}$ is different from any one of $T_{y11}$ and $T_{y12}$. This can implement a function of selecting at least three wavelengths on a same optical waveguide.

Further, optionally, $T_{y11}:T_{y1}2=2:3$, and $T_{y13}: T_{y14}=2:3$.

When a periodic change manner of the optical waveguide is the foregoing manner 2, manner 3, manner 4, and manner 5, at least one of the M optical waveguides that periodically change in the second dimension may be designed to have at least two different waveguide periods similar to that in the case 2.4. In other words, the periodic change manner in the second dimension may be replaced. Details are not described herein again. For details, refer to FIG. 9e.

It should be noted that FIG. 9b to FIG. 9e are top views, a bottom of the optical waveguide is located on a substrate, and a dashed box in FIG. 9b to FIG. 9e indicates the substrate.

2. Structure in the First Dimension

In a possible implementation, a width of each optical waveguide in the grating component in the first dimension is less than a half of the grating period, so that the grating component includes at least two optical waveguides. For example, a range of the grating period is not less than 100 nm and not greater than 2 μm.

The following describes an example in which the grating component includes three optical waveguides, and two optical waveguides periodically change in the second dimension and have different structures.

FIG. 10a is a top view of a diffractive optical element according to this application. A viewing direction is perpendicular to a surface of the diffractive optical element (that is, a direction of a z axis in FIG. 10a). The diffractive optical element may include grating components periodically distributed in a first dimension (that is, a direction of an x axis in FIG. 10a). Each grating component includes three (that is, N=3) optical waveguides, and the three optical waveguides are parallel to each other. Two (that is, M=2) optical waveguides periodically change in a second dimension (a direction of a y axis in FIG. 10a) (in a periodic change manner that is the foregoing manner 1), and the two optical waveguides have different waveguide periods, respectively $T_{y1}$ and $T_{y2}$. Each of the two optical waveguides that periodically change in the second dimension is symmetric about a central line of the optical waveguide.

FIG. 10b shows an example of a side view of the diffractive optical element shown in FIG. 10a at a cut-off position. A viewing direction of the side view is parallel to the surface of the diffractive optical element.

Figure 10C:
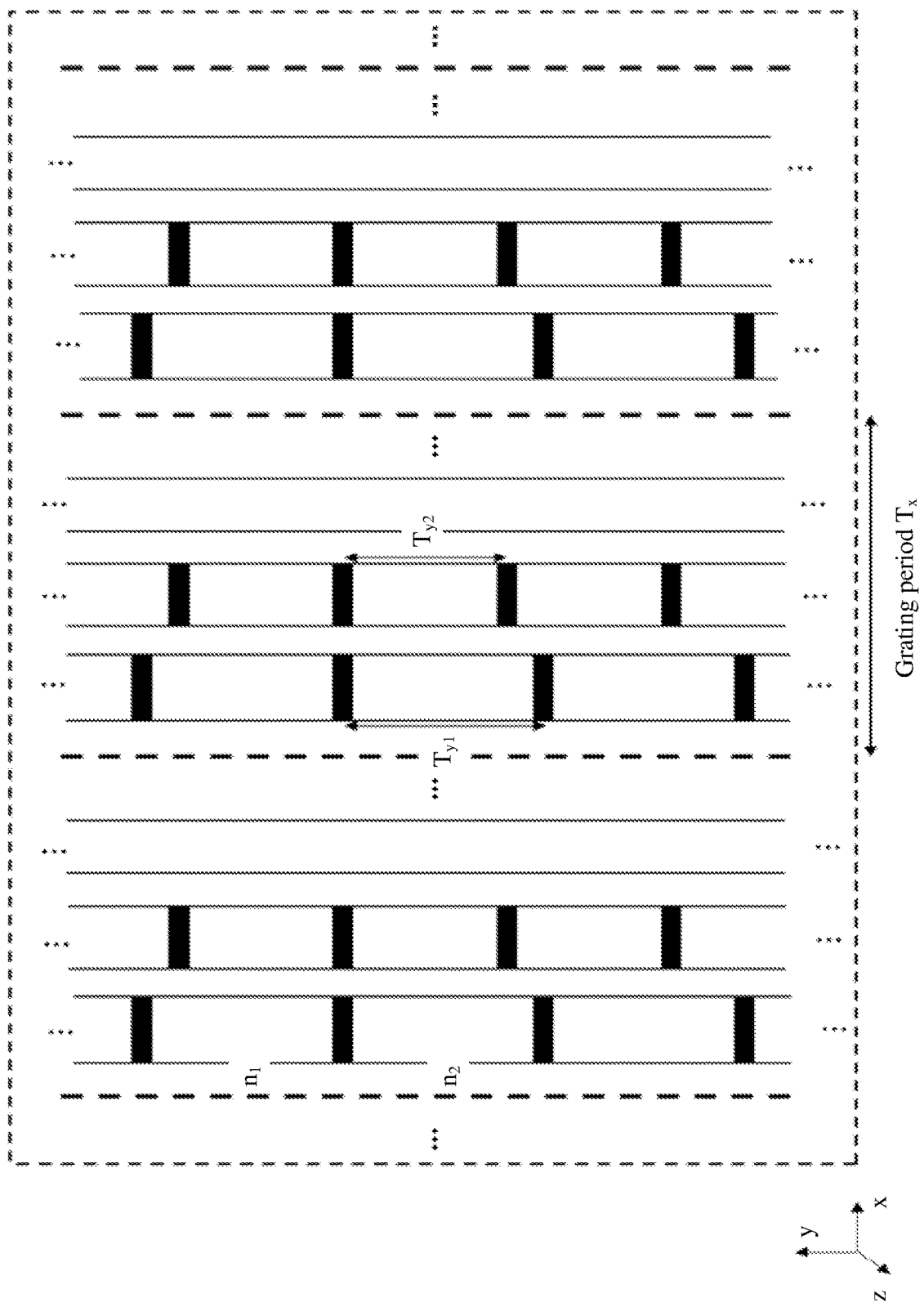
FIG. 10c is a top view of another structure of a diffractive optical element according to this application.

FIG. 10c is a schematic diagram of another structure of a diffractive optical element according to this application. The diffractive optical element may include grating components periodically distributed in a first dimension (a direction of an x axis in FIG. 10c). The grating component includes three (that is, N=3) optical waveguides, and the three optical waveguides are parallel to each other. Two (that is, M=2) optical waveguides periodically change in a second dimension (a direction of a y axis in FIG. 10c) (in a periodic change manner that is the foregoing manner 5), and the two optical waveguides have different waveguide periods.

Figure 10D:
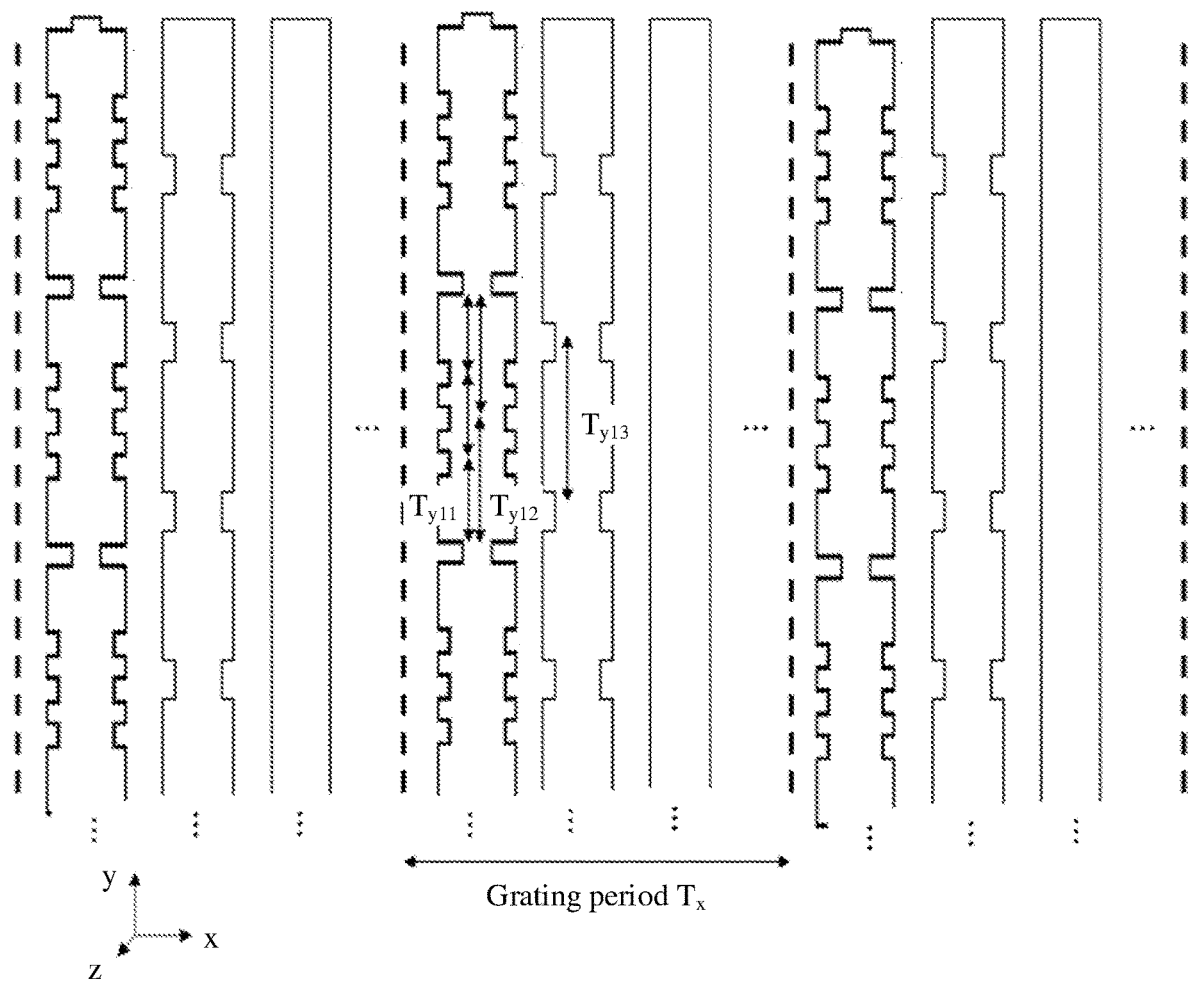
FIG. 10d is a top view of still another structure of a diffractive optical element according to this application.

FIG. 10d is a schematic diagram of still another structure of a diffractive optical element according to this application. The diffractive optical element may include grating components periodically distributed in a first dimension (a direction of an x axis in FIG. 10d). The grating component includes three (that is, N=3) optical waveguides, and the three optical waveguides are parallel to each other. Two (that is, M=2) optical waveguides periodically change in a second dimension (a direction of a y axis in FIG. 10c). A periodic change manner of one optical waveguide is the foregoing manner 1, and the optical waveguide has one waveguide period. In other words, two side walls of the optical waveguide have a same waveguide period. A periodic change manner of the other optical waveguide is the foregoing manner 1, and waveguide periods at two sides of the optical waveguide are based on the foregoing case 2.1.

Figure 10E:
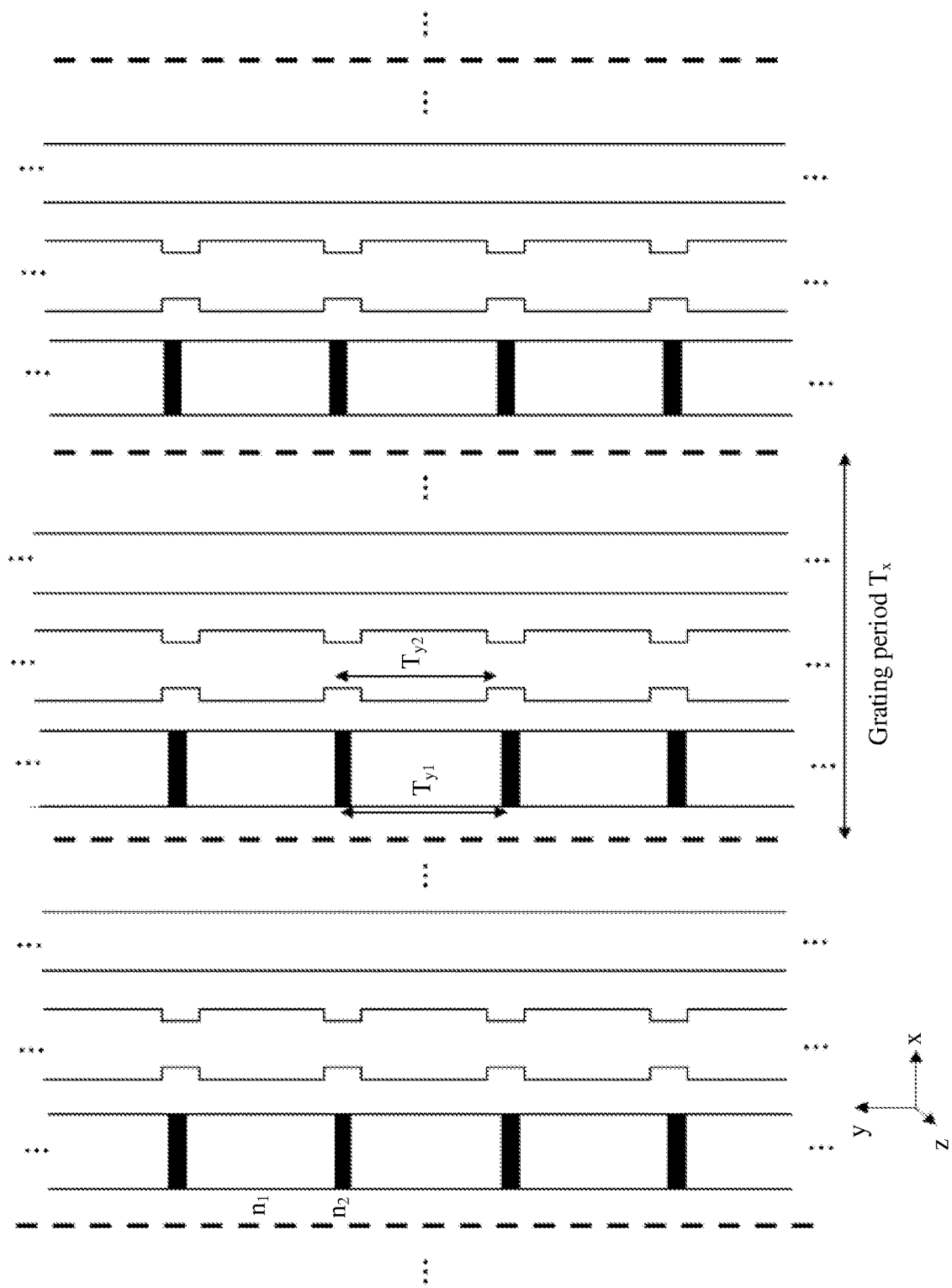
FIG. 10e is a top view of yet another structure of a diffractive optical element according to this application.

FIG. 10e is a schematic diagram of yet another structure of a diffractive optical element according to this application. The diffractive optical element may include grating components periodically distributed in a first dimension (a direction of an x axis in FIG. 10e). The grating component includes three (that is, N=3) optical waveguides, and the three optical waveguides are parallel to each other. Two (that is, M=2) optical waveguides periodically change in a second dimension (a direction of a y axis in FIG. 10e). A periodic change manner of one optical waveguide is the foregoing manner 5, and the optical waveguide has one waveguide period. A periodic change manner of the other optical waveguide is the foregoing manner 1, the optical waveguide also has one waveguide period, and waveguide periods of the two optical waveguides are different.

It should be noted that in the foregoing embodiments, unless otherwise stated or there is a logic conflict, terms and/or descriptions in different embodiments are consistent and may be mutually referenced, and technical features in different embodiments may be combined based on an internal logical relationship thereof, to form a new embodiment. Examples are not listed one by one herein.

Based on the foregoing content, a diffraction angle, a response band, and diffraction efficiency of the diffractive optical element can be adjusted. The following provides detailed descriptions in cases. In a possible implementation, a structure parameter and a material parameter of the diffractive optical element may be set based on the diffraction angle and a wavelength requirement of light, so that the diffractive optical element implements a specific function.

Case 1: The diffraction angle is adjusted.

In a possible implementation, a grating period of a grating component and/or a tilt angle of the grating component may be designed to adjust the diffraction angle responded by the diffractive optical element.

With reference to the foregoing formula 1, the grating period (Tx in FIG. 10a to FIG. 10e) and the tilt angle may be designed based on an incident angle and a wavelength of incident light, to obtain a required diffraction angle at a specific diffraction order. For a specific principle, refer to the foregoing formula 1. Details are not described herein again.

For example, for coplanar incident light, refer to the foregoing formula 1. A wavelength of the incident light is 525 nm (visible light), an incident angle is 60°, the grating period is distributed between 0.3 μm and 1.5 μm, and a diffraction angle distribution range of $1^{st}$ order diffractive light is −30° to 30°.

In the case 1, adjustment on reflection at an abnormal angle of the diffractive optical element can be implemented.

Case 2: The response band is adjusted.

In a possible implementation, a parameter in the grating component may be designed. For example, a waveguide period of at least one of M optical waveguides that periodically change in the second dimension may be designed, to control a resonance wavelength of guided-mode resonance, thereby implementing an optical response of the diffractive optical element to a specific band, that is, controlling a band in which a narrowband response is located.

With reference to FIG. 10a, FIG. 10c, and FIG. 10e, $T_{y1}$ and/or $T_{y2}$ may be designed to control a resonance wavelength of guided-mode resonance, and adjust a band of a narrowband response of the diffractive optical element. With reference to FIG. 10d, $T_{y11}$, $T_{y12}$, and/or $T_{y13}$ may be designed to control a resonance wavelength of guided-mode resonance, and adjust a band of a narrowband response of the diffractive optical element. It should be understood that the resonance wavelength is related to the waveguide periods $T_{y1}$ and/or $T_{y2}$.

Case 3: The diffraction efficiency is adjusted.

In a possible implementation, a parameter in the grating component may be designed, for example, a width, a thickness, a position of each of N optical waveguides (a distance between optical waveguides may be designed), and/or a periodic change manner of at least one of M optical waveguides that periodically change in a second dimension, so that different optical waveguides cause different phase delays of the incident light due to a difference in sizes or resonance wavelengths, to form wavefront distribution of reflected light at a specific angle. Therefore, more diffractive energy is concentrated at a specific diffraction order (for example, Pt order diffractive light in FIG. 11b and FIG. 11c simulated in the following figure), to increase diffraction efficiency at a specific diffraction angle.

Based on the foregoing content, the following describes in detail, with reference to a simulation result, the diffractive optical element provided in this application that can adjust a narrowband response and reflection at an abnormal angle.

This simulation verification is performed by using an example in which a wavelength of incident light is 525 nm, and a direction of a normal line of the incident light and a grating surface form an angle of 60 degrees (that is, an incident angle is 60°). According to a grating equation (refer to the foregoing formula 1), for the incident light with the wavelength of 525 nm, a grating period Tx is 606 nm, and it may be determined that angles corresponding to first three diffraction orders of diffractive light are respectively 60 degrees (a $0^{th}$ order), 0 degrees (a $1^{st}$ order), and −60 degrees (a $2^{nd}$ order).

Figure 11A:
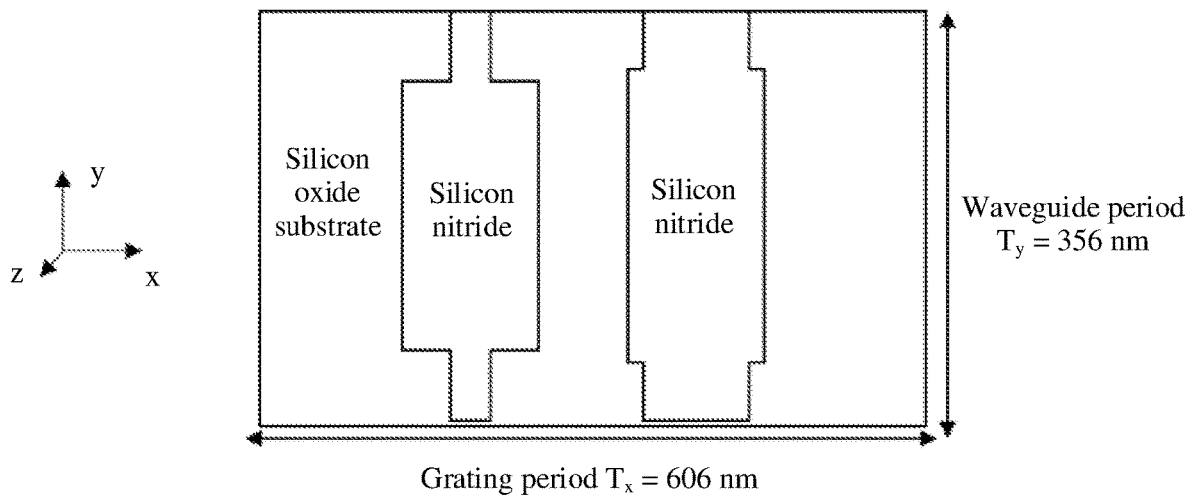
FIG. 11a is a schematic diagram of a structure of another diffractive optical element according to this application.
Figure 11B:
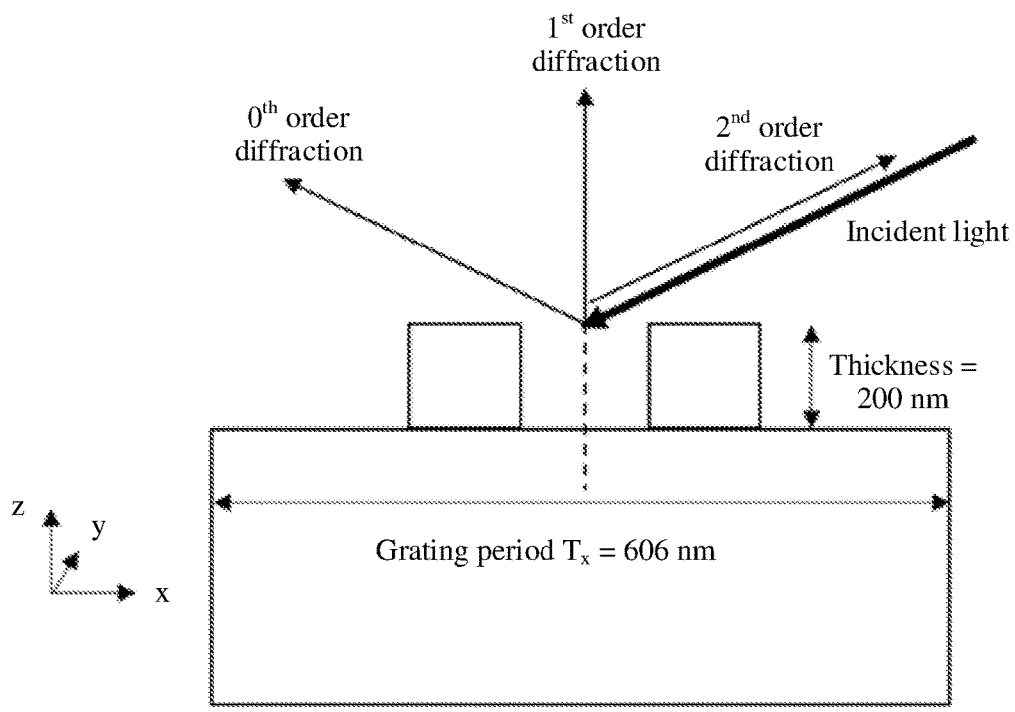
FIG. 11b is a side view of a diffractive optical element according to this application.

FIG. 11a is a schematic diagram of a structure of a diffractive optical element on which simulation is based. In the simulation, a material of an optical waveguide is silicon nitride, a material of a substrate is silicon oxide, and air is above a grating component. A grating period Tx is 606 nm, and a thickness of the optical waveguide is set to 200 nm. Each grating component includes two optical waveguides. The two optical waveguides periodically change in a second dimension. The waveguide periods of the two optical waveguides in the second dimension are the same, that is, 356 nm. However, the two optical waveguides have different shapes in the second dimension. In other words, different structures of the two optical waveguides are reflected in that the two optical waveguides that periodically change in the second dimension have different specific shapes, including different lengths of recessed portions. Based on the diffractive optical element shown in FIG. 11a, FIG. 11b shows a side view of an example of the diffractive optical element.

Figure 11C:
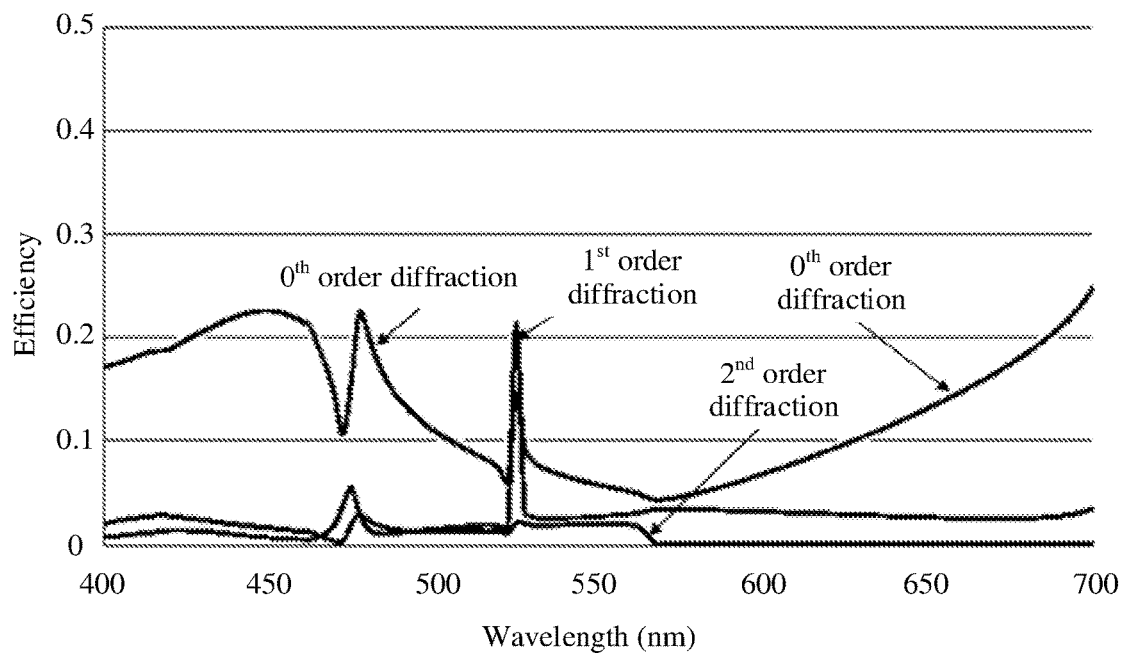
FIG. 11c is a schematic diagram of diffraction efficiency distribution of simulated $0^{th}$ order, $1^{st}$ order, and $2^{nd}$ order diffractive light at different wavelengths according to this application.

Based on the structure of the diffractive optical element shown in FIG. 11a, FIG. 11c is a schematic diagram of diffraction efficiency distribution of simulated $0^{th}$ order, Pt order, and $2^{nd}$ order diffractive light at different wavelengths according to this application. This simulation uses rigorous coupled wave analysis (rigorous coupled wave analysis, RCWA) to calculate the diffraction efficiency distribution of diffractive light with diffraction orders of 0, 1 and 2 at different wavelengths. It can be learned from a result in FIG. 11c that, the $1^{st}$ order diffractive light has significant efficiency improvement near a wavelength of 525 nm, and has lower efficiency and a narrowband response in another band. In addition, the Pt order diffractive light has higher diffraction efficiency near the wavelength of 525 nm than that of the $0^{th}$ order and $2^{nd}$ order diffractive light. This indicates that in this case, most reflected energy of light that is incident at an angle of 60 degrees is reflected at an angle of 0 degrees, and is reflected at an abnormal angle. Therefore, the simulation result may indicate that the diffractive optical element can implement a function of reflection at the abnormal angle in a narrowband.

Figure 11D:
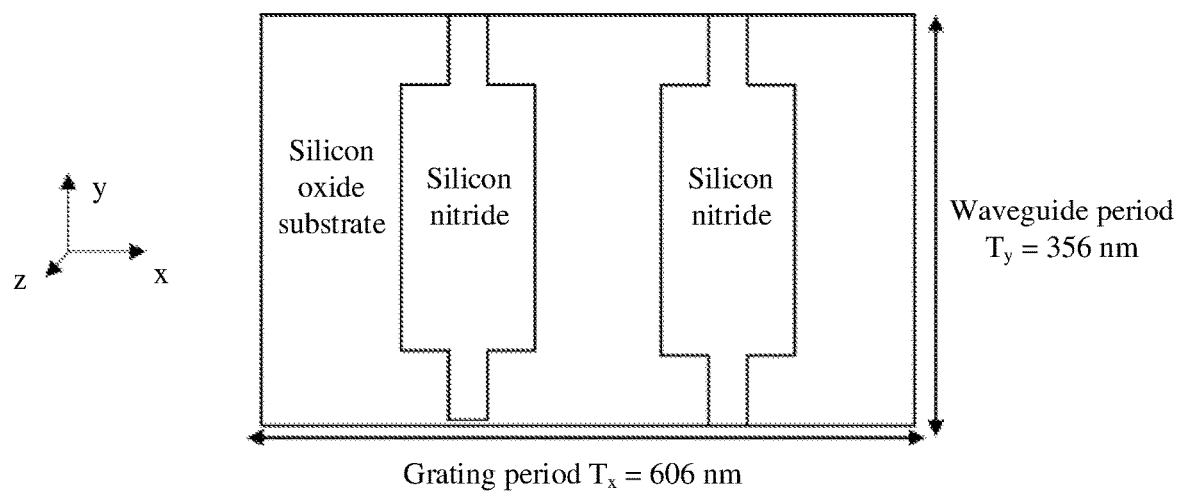
FIG. 11d is a schematic diagram of still another structure of a diffractive optical element according to this application.

FIG. 11d is a schematic diagram of still another structure of a diffractive optical element on which simulation is based. In the simulation, a material of an optical waveguide is silicon nitride, a material of a substrate is silicon oxide, and air is above a grating component. A grating period Tx is 606 nm, and a thickness of the optical waveguide is set to 200 nm. Each grating component includes two optical waveguides. The two optical waveguides periodically change in a second dimension, and structures of the two optical waveguides are completely the same.

Figure 11E:
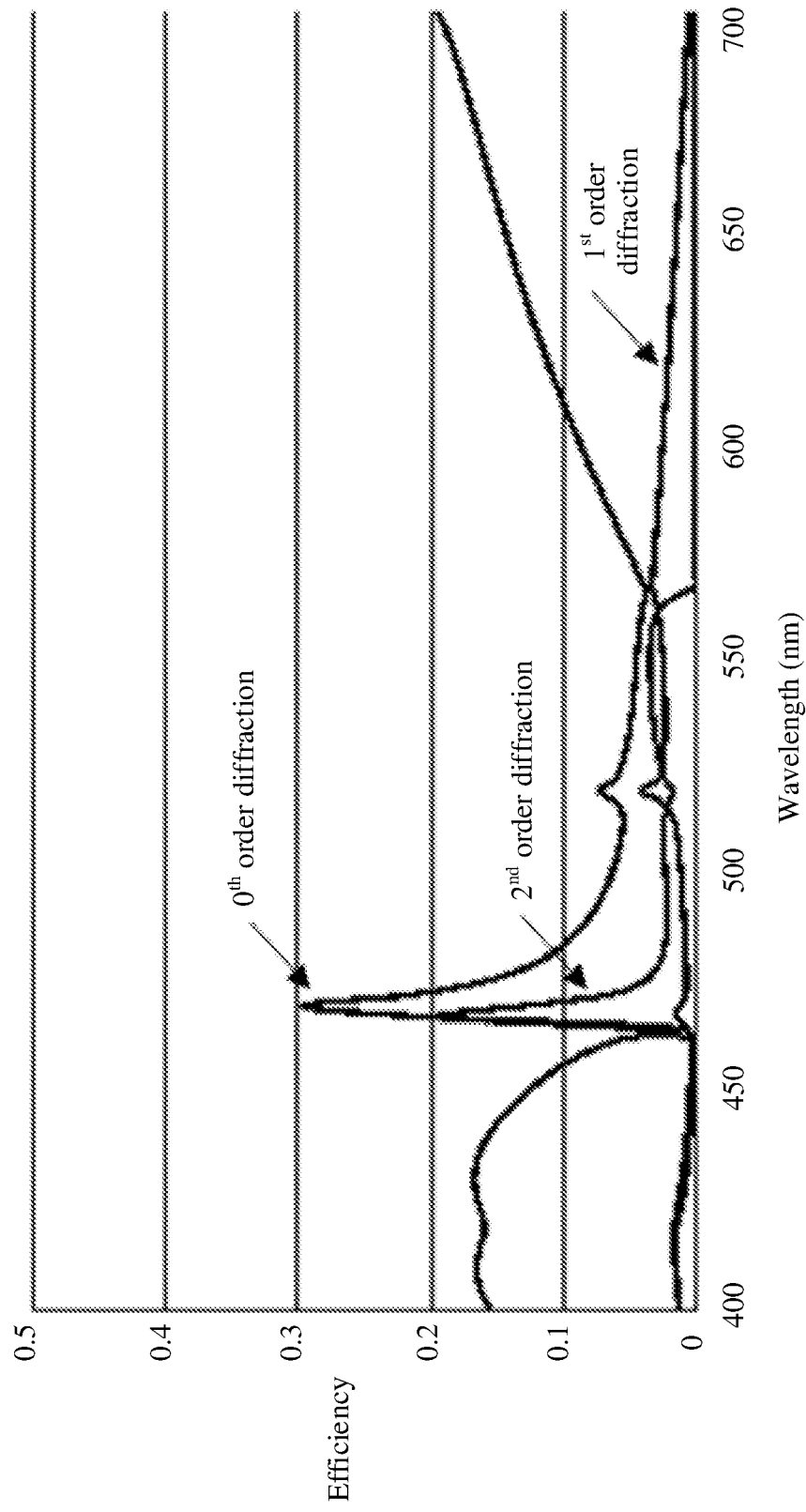
FIG. 11e is another schematic diagram of diffraction efficiency distribution of simulated $0^{th}$ order, $1^{st}$ order, and $2^{nd}$ order diffractive light at different wavelengths according to this application.

Based on the structure of the diffractive optical element shown in FIG. 11d, FIG. 11e is another schematic diagram of diffraction efficiency distribution of simulated $0^{th}$ order, $1^{st}$ order, and $2^{nd}$ order diffractive light at different wavelengths according to this application. This simulation also uses RCWA to calculate the diffraction efficiency distribution of diffractive light with diffraction orders of 0, 1 and 2 at different wavelengths. It can be learned from a result in FIG. 11e that, the $0^{th}$ order diffractive light has significant efficiency improvement near a wavelength of 475 nm, and has lower efficiency and a narrowband response in another band. In addition, the $0^{th}$ order diffractive light has higher diffraction efficiency near the wavelength of 475 nm than that of the $1^{st}$ order and $2^{nd}$ order diffractive light. This indicates that in this case, most reflected energy of light that is incident at an angle of 60 degrees is reflected at an angle of 60 degrees, and is weakly reflected at an abnormal angle.

Figure 11F:
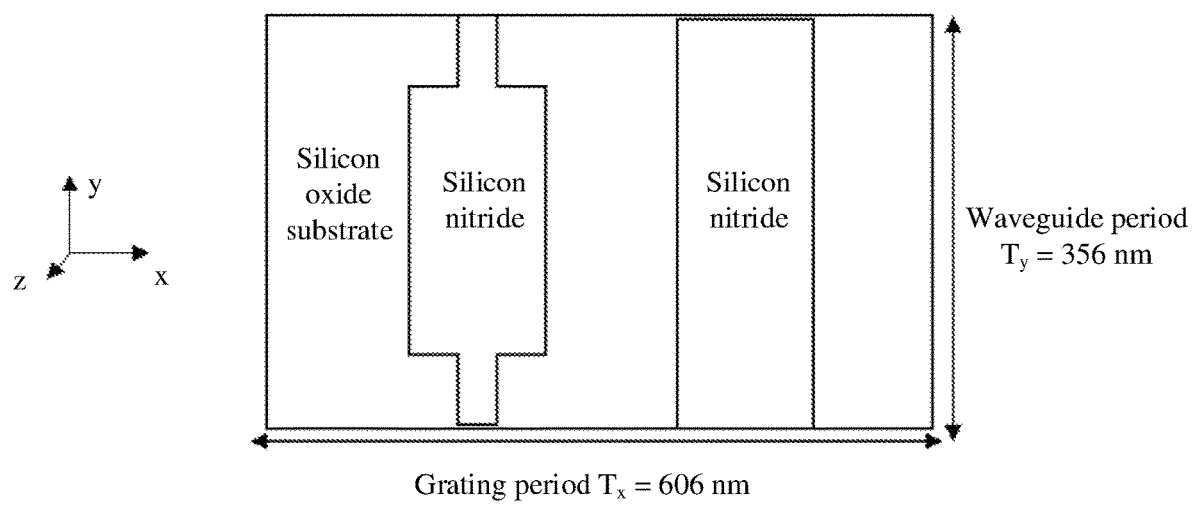
FIG. 11f is a schematic diagram of yet another structure of a diffractive optical element according to this application.

FIG. 11f is a schematic diagram of yet another structure of a diffractive optical element on which simulation is based. In the simulation, a material of an optical waveguide is silicon nitride, a material of a substrate is silicon oxide, and air is above a grating component. A grating period Tx is 606 nm, and a thickness of the optical waveguide is set to 200 nm. Each grating component includes two optical waveguides, including one optical waveguide that periodically changes in a second dimension.

Figure 11G:
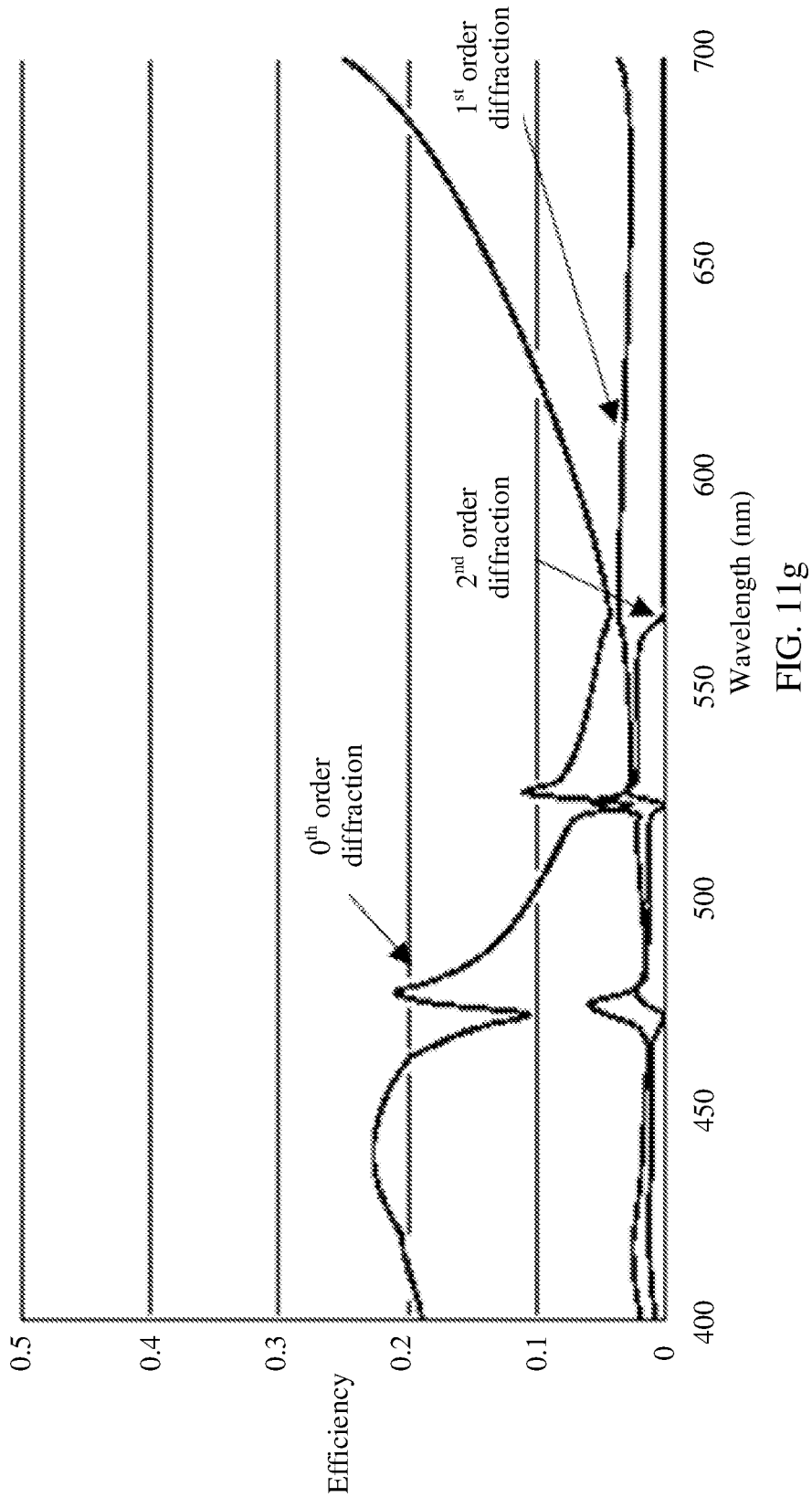
FIG. 11g is still another schematic diagram of diffraction efficiency distribution of simulated $0^{th}$ order, $1^{st}$ order, and $2^{nd}$ order diffractive light at different wavelengths according to this application.

Based on the structure of the diffractive optical element shown in FIG. 11f, FIG. 11g is still another schematic diagram of diffraction efficiency distribution of simulated $0^{th}$ order, $1^{st}$ order, and $2^{nd}$ order diffractive light at different wavelengths according to this application. This simulation also uses RCWA to calculate the diffraction efficiency distribution of diffractive light with diffraction orders of 0, 1 and 2 at different wavelengths. It can be learned from a result in FIG. 11g that, the $0^{th}$ order diffractive light has significant efficiency improvement near a wavelength of 485 nm, and has lower efficiency and a narrowband response in another band. In addition, the $0^{th}$ order diffractive light has higher diffraction efficiency near the wavelength of 525 nm than that of the Pt order and $2^{nd}$ order diffractive light. This indicates that in this case, most reflected energy of light that is incident at an angle of 60 degrees is reflected at an angle of 60 degrees, and basically cannot be reflected at an abnormal angle.

It can be learned from FIG. 11c, FIG. 11e, and FIG. 11g that, when only one of the two optical waveguides included in the grating component periodically changes in the second dimension, diffraction efficiency of the $0^{th}$ order diffractive light is significantly improved. This indicates that most energy of light that is incident at an angle of 60 degrees is reflected at an angle of 60 degrees. In this case, it is difficult to implement a function of reflection at an abnormal angle. When two of the two optical waveguides included in the grating component periodically change in the second dimension, and structures of the two optical waveguides are completely the same, both diffraction efficiency of the $0^{th}$ order diffractive light and diffraction efficiency of the $2^{nd}$ order diffractive light are high. This indicates that in this case, most reflected energy of light that is incident at an angle of 60 degrees is reflected at an angle of 60 degrees, and some reflected energy is reflected at an angle of −60 degrees and can be reflected at a specific abnormal angle, but it is difficult to implement a narrowband response. In the two optical waveguides included in the grating component, when two optical waveguides periodically change in the second dimension and the two optical waveguides that periodically change in the second dimension have different structures, the Pt diffractive light has significant diffraction efficiency improvement, and has lower efficiency and a narrowband response in another band. In addition, the Pt diffractive light has higher diffraction efficiency near the wavelength of 525 nm than that of the $0^{th}$ order and $2^{nd}$ order diffractive light. This indicates that in this case, most reflected energy of light that is incident at an angle of 60 degrees is reflected at an angle of 0 degrees, and is reflected at an abnormal angle. In other words, at least two of the M optical waveguides that periodically change in the second dimension have different structures, so that both a function of reflection at an abnormal angle and a narrowband response can be implemented.

In this application, the diffractive optical element may further include a substrate. The following describes an example of the substrate.

In a possible implementation, the grating component may be disposed on the substrate. A material of the substrate includes but is not limited to silicon oxide, silicon nitride, titanium oxide, silicon, polymer, metal, or the like.

Further, optionally, the substrate may be single-layer or multi-layer. For example, a layer of a planar optical waveguide structure or a plurality of layers of materials whose refractive indexes are changeable exist at a side that is of the substrate and that is close to the grating component. When the substrate is multi-layer, a Bragg reflector may be formed, so that incident light in a specific band may be reflected.

Parameters of the grating component set based on different regions of the substrate can be classified into the following two cases. The parameters of the grating component include a grating period, a tilt angle, a structure parameter in the grating component, and the like.

Case A: The parameters of the grating component in different regions of the substrate are the same.

Figure 12:
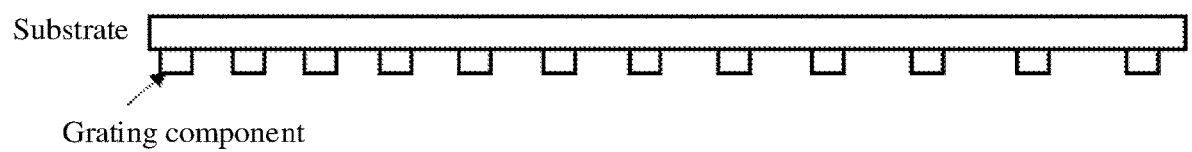
FIG. 12 is a schematic diagram of a structure of grating components with a same parameter in different regions of a substrate according to this application.

FIG. 12 is a schematic diagram of a structure of grating components with a same parameter in different regions of a substrate according to this application. Parameters of the grating components in different regions of the substrate are designed in a unified manner. Therefore, optical responses (for example, a selected narrowband or an abnormal angle) presented by the entire grating component are consistent.

Case B: The parameters of the grating component in different regions of the substrate are different.

Figure 13A:
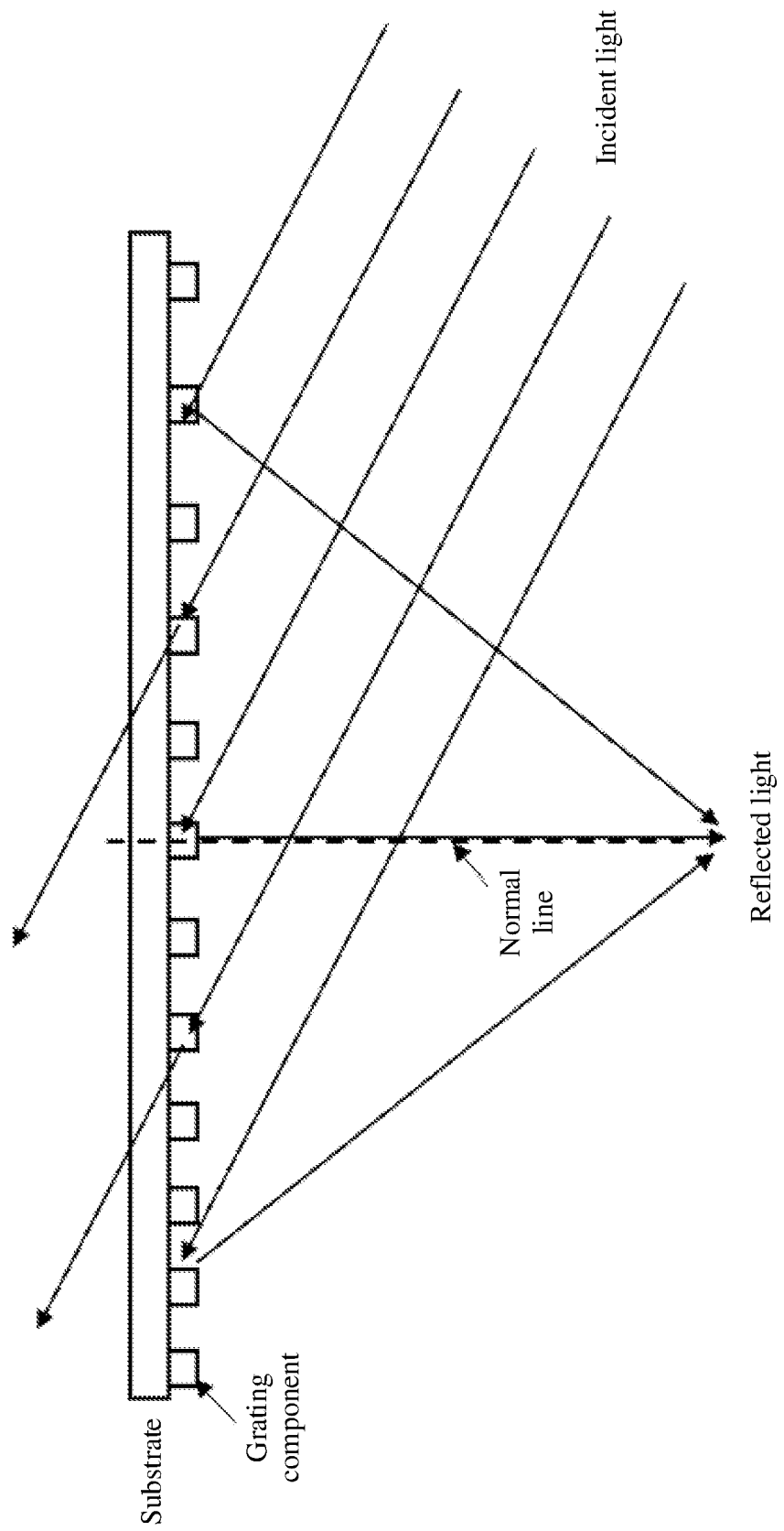
FIG. 13a is a schematic diagram of a structure of grating components with different parameters in different regions of a substrate according to this application.

In a possible implementation, the parameters of the grating components in the diffractive optical element fastened to different regions of the substrate are different. FIG. 13a is a schematic diagram of a structure of grating components with different parameters in different regions of a substrate according to this application. This can implement focusing on a responded narrowband. Further, this is applicable to AR glasses, AR helmets, VR glasses, VR helmets, or the like.

Figure 13B:
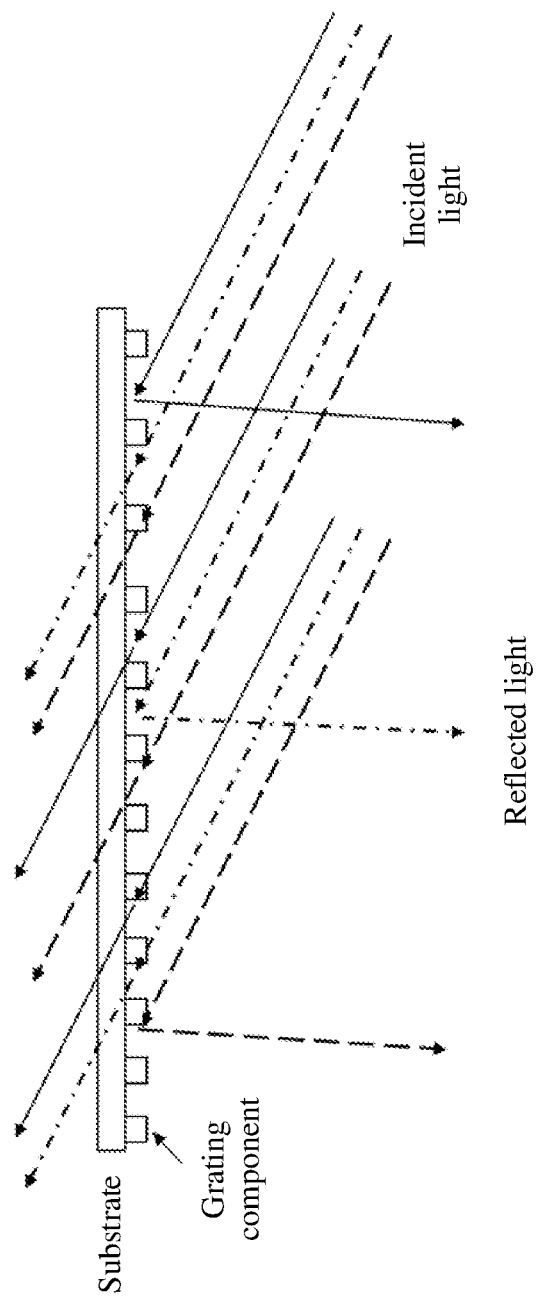
FIG. 13b is a schematic diagram of focusing formed by a diffractive optical element according to this application.

Grating components with different parameters are set in different regions of the substrate, so that the grating components in different regions of the substrate implement responses at different diffraction angles on incident light emitted in a same direction, or implement narrowband reflection at abnormal angles in different bands, thereby implementing focusing, collimation, imaging, or the like on light in a specific narrowband. For example, the incident light (for example, incident light in a specific band) emitted in the same direction may be reflected towards a spatial position, to form focused light. Refer to FIG. 13b. It should be understood that only the light in the specific band is collimated to a specific spatial position, and there is no response to incident light at another wavelength. It may also be understood that the diffractive optical element has a filtering function. The grating components in different regions of the substrate can respond to light in different bands. In FIG. 13b, different line types indicate different bands.

It should be noted that the diffractive optical element may diffract, in a specific band, incident light having any wavefront spatial distribution to form reflected light having any wavefront spatial distribution. This is not limited to focusing or collimation in the foregoing example. In other words, incident light may be emitted in parallel, or may not be emitted in parallel. Diffractive light may be focused on a point, or may be reflected to different positions.

Based on the case B, the diffractive optical element is applicable to the imaging optical system shown in FIG. 2, and is used as an optical combiner of the imaging optical system. The diffractive optical element may reflect incident light in a specific band sent from the optical projection system at different diffraction angles in different regions, and emit the light in the specific band to human eyes for imaging. In addition, ambient light in another band may also be transmitted to the human eyes for imaging through the diffractive optical element.

The optical combiner based on the diffractive optical element can implement high transmittance of the ambient light and high reflectivity of projection. This helps improve visual effect of fusion of a real world image and a virtual world image in an AR display system. It should be understood that the substrate in the diffractive optical element applied to the AR display system is transparent.

It should be noted that the diffractive optical element may also be used in a virtual reality (virtual reality, VR) optical system. In this case, the substrate is non-transparent, or the substrate has a reflection feature. For example, metal, a Bragg reflector, or the like may be used in the substrate, to enhance reflection efficiency of the diffractive optical element.

For example, the diffractive optical element may be an optical element (for example, a filter or an optical splitter) having a response in a specific band, or may be an imaging device (for example, an optical combiner).

Figure 14:
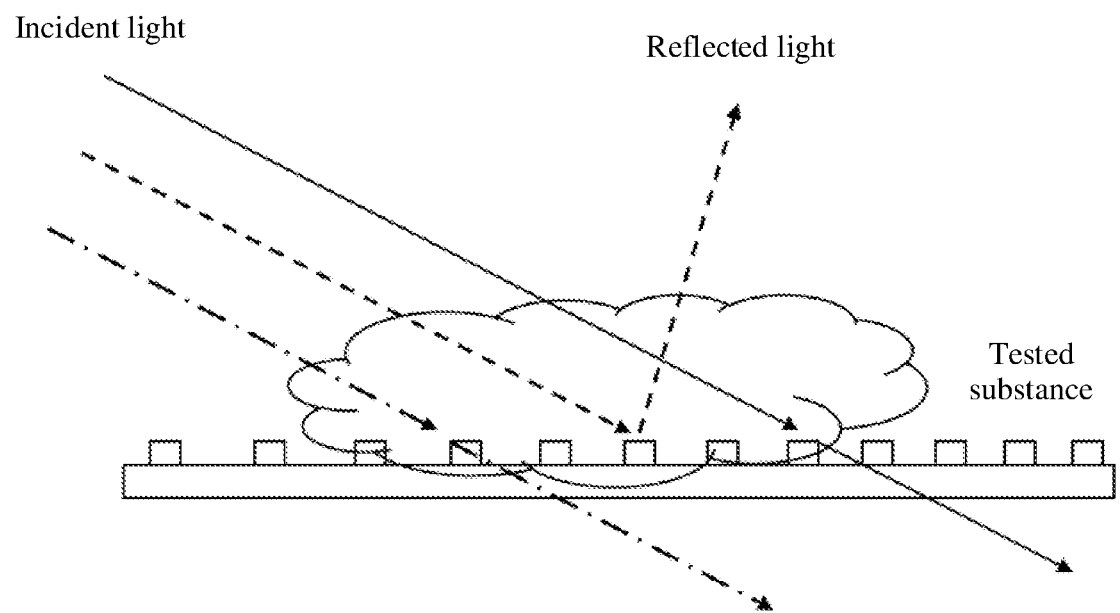
FIG. 14 is a schematic diagram of a structure of a diffractive optical element used for spectrum detection according to this application.

Based on the diffractive optical element in any one of the foregoing embodiments, FIG. 14 shows a diffractive optical element used for spectrum detection according to this application. A response band or a diffraction angle of the diffractive optical element is affected by detected substance. A working principle of the diffractive optical element used for spectrum detection is as follows: Existence, composition, concentration, or a refractive index of the detected substance affects the effective refractive index of the optical waveguide in the grating component, so that a resonance wavelength of guided-mode resonance changes. Alternatively, a phase delay of incident light caused by the optical waveguide in the grating component changes, so that the diffraction angle changes.

Therefore, information such as existence, composition, concentration, or the refractive index of the detected substance may be determined by detecting a reflection angle change of reflected light or a spectral change of the reflected light.

It should be understood that, calibration may be performed before spectrum detection, so that a relationship between existence of the detected substance and a range of a response band and a diffraction angle, a relationship between the concentration of the detected substance and the range of the response band and the diffraction angle, a relationship between the composition of the detected substance and the range of the response band and the diffraction angle, a relationship between the concentration of the detected substance and the range of the response band and the diffraction angle, a relationship between the refractive index of the detected substance and the range of the response band and the diffraction angle, and the like can be separately determined.

Based on the foregoing content, the diffractive optical element is applicable to a terminal device. The terminal device may include K layers of diffractive optical elements and K layers of substrates in any one of the foregoing embodiments. The K layers of diffractive optical elements are in a one-to-one correspondence with the K layers of substrates. Each of the K layers of diffractive optical elements is fixed on a corresponding substrate, and K is a positive integer.

In a possible implementation, grating components at different layers of the K layers may respond to a same narrowband, or may respond to different narrowbands.

Figure 15:
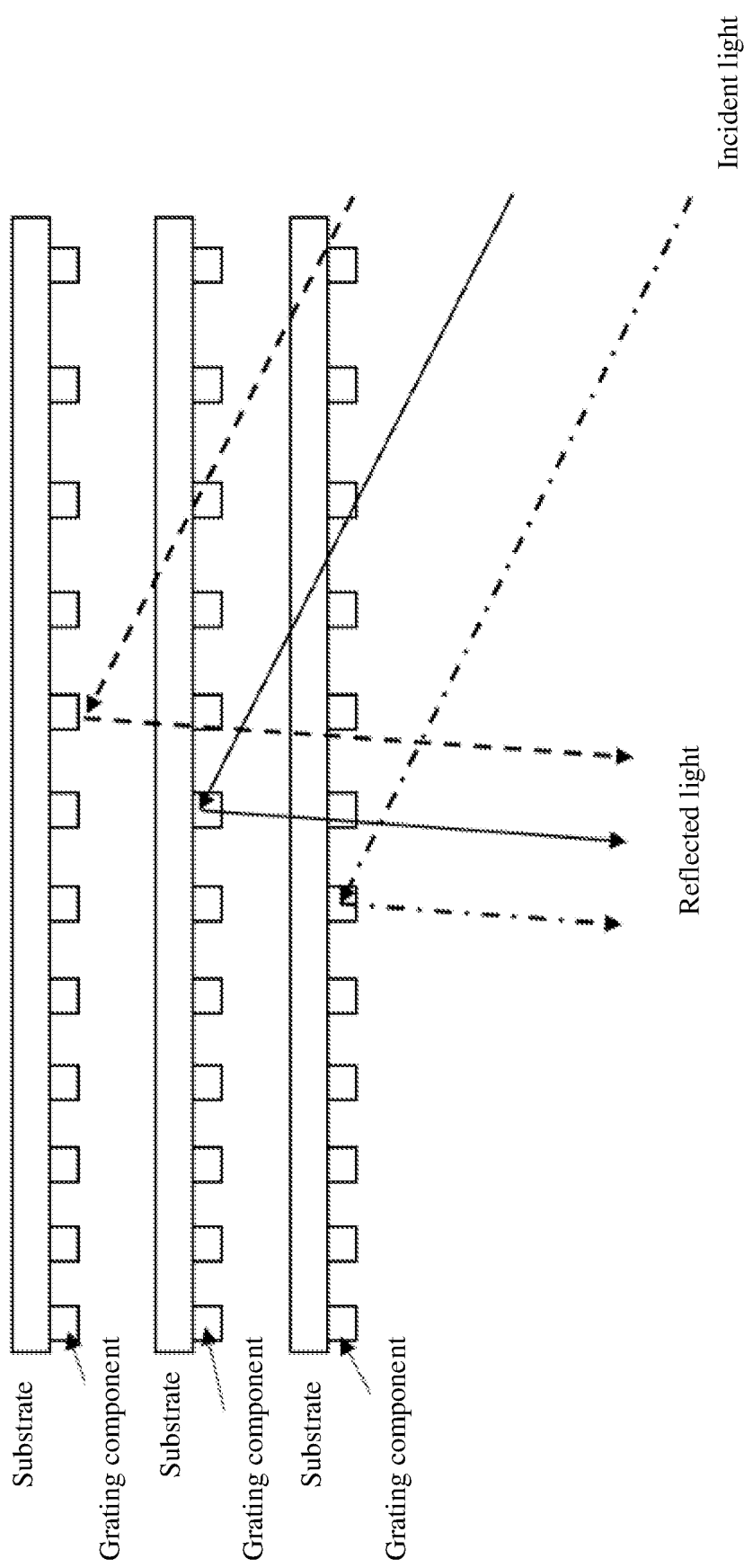
FIG. 15 is a schematic diagram of a structure of a terminal device according to this application.

FIG. 15 is a schematic diagram of a structure of a terminal device according to this application. For example, the terminal device includes three layers of diffractive optical elements and three layers of substrates. In this example, grating components at each of the three layers responds to different narrowbands, and different types of lines indicate different response bands. It should be understood that grating components at a same layer may respond to a same band (as shown in FIG. 15), or may respond to different bands (refer to FIG. 13b).

For example, one of the three layers may respond to light in a red band, another layer may respond to light in a green band, and the remaining layer may respond to light in a blue band. In this way, color display may be implemented. For example, when the terminal device is an AR device or a VR device, one of the three layers may respond to light in a red band in a colored light beam from an optical projector, and reflect the light in the red band to a specific direction in space (for example, a direction of an area in which human eyes are located). Another layer may respond to light in a green band in the color light beam from the optical projector, and also reflect the light in the green band to the specific direction in space (for example, the direction of the area in which the human eyes are located). The remaining layer may respond to light in a blue band in the color light beam from the optical projector, and also reflect the light in the blue band to the specific direction in space (for example, the direction of the area in which the human eyes are located). In this way, an image projected by the AR device or the VR device to the human eyes is a colored image. In addition, applying the diffractive optical element to the AR device or the VR device helps miniaturize the AR device or the VR device.

It should be noted that the incident light may be parallel light, or may be non-parallel light. Emergent light may also be parallel light, which indicates that the diffractive optical element may collimate a plurality of beams of incident light. The emergent light may also be non-parallel light.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "perpendicularity" may not mean absolute perpendicularity, and some engineering errors may be allowed. For example, "the first dimension is perpendicular to the second dimension" as mentioned above. "At least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural. In the text descriptions of this application, the character "/" usually indicates an "or" relationship between associated objects. In a formula in this application, the character "/" indicates a "division" relationship between the associated objects. In addition, the word "example" in this application is used to represent giving an example, an illustration, or a description. Any embodiment or design scheme described as an "example" in this application should not be explained as being more preferred or having more advantages than another embodiment or design scheme. Alternatively, it may be understood that the term "example" is used to present a concept in a specific manner, and does not constitute a limitation on this application. A symbol "(a, b)" represents an open interval with a range greater than a and less than b, "[a, b]" represents a closed interval with a range greater than or equal to a and less than or equal to b, "(a, b]" represents a half-open and half-closed interval with a range greater than a and less than or equal to b, and "(a, b]" represents a half-open and half-closed interval with a range greater than a and less than or equal to b. For example, (0, 90°) represents greater than 0 degrees and less than 90 degrees.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes. The terms "first", "second", and another similar expression are intended to distinguish between similar objects but do not necessarily indicate a specific order or sequence. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

Although this application is described with reference to specific features and embodiments thereof, it is clear that various modifications and combinations may be made to them without departing from the spirit and scope of this application. Correspondingly, the specification and accompanying drawings are merely examples for description of the solutions defined by the appended claims, and are considered as any of or all modifications, variations, combinations or equivalents that cover the scope of this application.

It is clear that a person skilled in the art can make various modifications and variations to this application without departing from the spirit and the scope of the present invention. This application is intended to cover these modifications and variations provided that they fall within the scope of protection defined by the following claims and their equivalent technologies.

What is claimed is:

1. A diffractive optical element, comprising:
   a plurality of grating components periodically distributed in a first dimension, wherein:
      each grating component of the plurality of grating components comprises N optical waveguides,
      the N optical waveguides comprise M optical waveguides that periodically change in a second dimension,
      at least two of the M optical waveguides that periodically change in the second dimension have different structures, and
      an included angle between the second dimension and the first dimension is greater than 0 degrees and less than 180 degrees, N is an integer greater than 1, and M is an integer greater than 1 and not greater than N.

2. The diffractive optical element according to claim 1, wherein at least one of the M optical waveguides that periodically change in the second dimension has at least two different waveguide periods.

3. The diffractive optical element according to claim 2, wherein that the at least one of the M optical waveguides has at least two different waveguide periods comprises at least one of the following:
   a top of the at least one of the M optical waveguides has at least two different waveguide periods;
   at least one of two side walls of the at least one of the M optical waveguides has at least two different waveguide periods; or
   each side wall of the at least one of the M optical waveguides has at least one waveguide period, and two side walls have different waveguide periods.

4. The diffractive optical element according to claim 1, wherein:
   the at least two of the M optical waveguides that periodically change in the second dimension have different periodic change manners;
   the at least two of the M optical waveguides that periodically change in the second dimension have different waveguide periods; or
   the at least two of the M optical waveguides that periodically change in the second dimension have different shapes.

5. The diffractive optical element according to claim 4, wherein a periodic change manner of an optical waveguide of the M optical waveguides comprises at least one of the following:
   the optical waveguide has a periodic protruding portion or a periodic recessed portion;
   the optical waveguide has a periodic gap;
   the optical waveguide comprises periodically distributed small holes, wherein each small hole is hollow or filled with a material whose refractive index is different from that of a material of the optical waveguide;
   periodically distributed diffraction structures are in contact with the optical waveguide;
   distances between the periodically distributed diffraction structures and the optical waveguide each do not exceed a preset distance; or
   the refractive index of the optical waveguide periodically changes.

6. The diffractive optical element according to claim 5, wherein the periodic change manner of the optical waveguide is that the optical waveguide has the periodic protruding portion or the periodic recessed portion, and the periodic protruding portion or the periodic recessed portion is located at a top or at least one side wall of the optical waveguide.

7. The diffractive optical element according to claim 5, wherein the periodic change manner of the optical waveguide is that the optical waveguide has the periodic gap, and a length of the periodic gap in the second dimension allows incident light to be coupled between two adjacent parts of the optical waveguide to form a waveguide mode.

8. The diffractive optical element according to claim 7, wherein the length of the periodic gap in the second dimension is not greater than a center wavelength of an operating band.

9. The diffractive optical element according to claim 5, wherein an included angle between a direction of the periodic gap and the first dimension is less than 90 degrees.

10. The diffractive optical element according to claim 5, wherein the periodic change manner of the optical waveguide comprises at least one of the following:

the periodically distributed diffraction structures are in contact with the optical waveguide;

the distances between the periodically distributed diffraction structures and the optical waveguide each do not exceed the preset distance, and the periodically distributed diffraction structures are in contact with a top or at least one side wall of the optical waveguide; or the periodically distributed diffraction structures each are located at a position whose distance from one side wall of the optical waveguide is not greater than the preset distance.

11. The diffractive optical element according to claim 10, wherein the preset distance between each diffraction structure and the optical waveguide allows a light field formed in the optical waveguide to spatially overlap the diffraction structures.

12. The diffractive optical element according to claim 11, wherein the preset distance between each diffraction structure and the optical waveguide is not greater than a center wavelength of an operating band.

13. A terminal device, comprising at least one layer of a diffractive optical element and at least one layer of a substrate, wherein:
each layer of the diffractive optical element corresponds to a respective layer of the substrate;
each layer of the diffractive optical element is fastened to a corresponding layer of the substrate; and
the diffractive optical element comprises:
a plurality of grating components periodically distributed in a first dimension, wherein:
each grating component of the plurality of grating components comprises N optical waveguides,
the N optical waveguides comprise M optical waveguides that periodically change in a second dimension,
at least two of the M optical waveguides that periodically change in the second dimension have different structures, and
an included angle between the second dimension and the first dimension is greater than 0 degrees and less than 180 degrees, N is an integer greater than 1, and M is an integer greater than 1 and not greater than N.

14. The terminal device according to claim 13, wherein parameters of grating components in the diffractive optical element fastened to different regions of the substrate are different, and the parameters of the grating components comprise at least one of a grating period or a tilt angle.

15. The terminal device according to claim 13, wherein at least one of the M optical waveguides that periodically change in the second dimension has at least two different waveguide periods.

16. The terminal device according to claim 15, wherein that the at least one of the M optical waveguides has at least two different waveguide periods comprises at least one of the following:
a top of the at least one of the M optical waveguides has at least two different waveguide periods;
at least one of two side walls of the at least one of the M optical waveguides has at least two different waveguide periods; or
each side wall of the at least one of the M optical waveguides has at least one waveguide period, and two side walls have different waveguide periods.

17. The terminal device according to claim 13, wherein:
the at least two of the M optical waveguides that periodically change in the second dimension have different periodic change manners;
the at least two of the M optical waveguides that periodically change in the second dimension have different waveguide periods; or
the at least two of the M optical waveguides that periodically change in the second dimension have different shapes.

18. The terminal device according to claim 17, wherein a periodic change manner of an optical waveguide of the M optical waveguides comprises at least one of the following:
the optical waveguide has a periodic protruding portion or a periodic recessed portion;
the optical waveguide has a periodic gap;
the optical waveguide comprises periodically distributed small holes, wherein each small hole is hollow or filled with a material whose refractive index is different from that of a material of the optical waveguide;
periodically distributed diffraction structures are in contact with the optical waveguide;
distances between the periodically distributed diffraction structures and the optical waveguide each do not exceed a preset distance; or
the refractive index of the optical waveguide periodically changes.

19. The terminal device according to claim 18, wherein the periodic change manner of the optical waveguide is that the optical waveguide has the periodic protruding portion or the periodic recessed portion, and the periodic protruding portion or the periodic recessed portion is located at a top or at least one side wall of the optical waveguide.

20. The terminal device according to claim 19, wherein the terminal device comprises an optical projector, and the optical projector is configured to transmit a light beam carrying image information to the diffractive optical element.

* * * * *